United States Patent
Song et al.

(10) Patent No.: US 11,914,262 B2
(45) Date of Patent: Feb. 27, 2024

(54) LIGHT SHUTTER PANEL AND TRANSPARENT DISPLAY APPARATUS HAVING THE SAME

(71) Applicant: LG Display Co., Ltd., Seoul (KR)

(72) Inventors: Youngki Song, Paju-si (KR); JaeHyun Park, Paju-si (KR); Sun Man Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 369 days.

(21) Appl. No.: 17/236,758

(22) Filed: Apr. 21, 2021

(65) Prior Publication Data

US 2021/0389640 A1 Dec. 16, 2021

(30) Foreign Application Priority Data

Jun. 11, 2020 (KR) ........................ 10-2020-0070964

(51) Int. Cl.
  *G02F 1/167* (2019.01)
  *G02F 1/1679* (2019.01)
  *G02F 1/1676* (2019.01)

(52) U.S. Cl.
  CPC ............ *G02F 1/167* (2013.01); *G02F 1/1676* (2019.01); *G02F 1/1679* (2019.01); *G02F 2203/01* (2013.01)

(58) Field of Classification Search
  CPC ....... G02F 1/167; G02F 1/1679; G02F 1/1676
  See application file for complete search history.

(56) References Cited

U.S. PATENT DOCUMENTS

2010/0134872 A1 6/2010 Johnson et al.
2019/0233662 A1* 8/2019 Guo ..................... C09D 11/033

FOREIGN PATENT DOCUMENTS

KR 10-2009-0082241 A 7/2009
KR 10-2014-0009830 A 1/2014
KR 10-2015-0038806 A 4/2015

\* cited by examiner

*Primary Examiner* — Lucy P Chien
(74) *Attorney, Agent, or Firm* — Fenwick & West LLP

(57) ABSTRACT

The present disclosure relates to a light shutter panel and a transparent display apparatus having the same. The light shutter panel comprises: a first light shutter panel and a second light shutter panel. Each of the first and second light shutter panels includes: a lower electrode plate, an upper electrode plate, a shutter layer, transparent spacers and a black ink. The lower electrode plate and the upper electrode plate are attached as facing each other. The shutter layer is disposed between the lower electrode plate and the upper electrode plate. The shutter layer includes a maximum light transmitting portion, a minimum light blocking portion, an ink storage portion and an electric field guide. The electric field guide is disposed between the ink storage portions. The transparent spacers maintain the gap between the lower electrode plate and the upper electrode plate. The black ink is filled into the ink storage portion.

19 Claims, 13 Drawing Sheets

LIGHT SHUTTER PANEL AND TRANSPARENT DISPLAY APPARATUS HAVING THE SAME

CROSS-REFERENCE TO RELATED APPLICATIONS

This application claims the benefit of Republic of Korea Patent Application No. 10-2020-0070964 filed on Jun. 11, 2020, which is hereby incorporated by reference in its entirety.

BACKGROUND

Field of Technology

The present disclosure relates to a light shutter panel and a transparent display apparatus having the same. Especially, the present disclosure relates to a light shutter panel selectively blocking or transmitting the light incident from the back side of the panel, and a transparent display apparatus with the same light shutter panel to selectively blocking or transmitting the background scene of the display device.

Discussion of the Related Art

Devices or apparatuses for displaying images have been developed in various forms such as CRT (cathode ray tube), LCD (liquid crystal display), PDP (plasma display panel), and electroluminescent display. In particular, the electroluminescent display may include a self-luminous display or a curved self-luminous display. For example, the display may include a light emitting display panel, a micro LED display panel, a flexible light emitting display panel, a flexible micro LED display panel, or a quantum dot light emitting display panel, but it is not limited thereto.

The main purpose of the display apparatus is for providing the video information. In some cases, it may be required to provide the video information with the background scene shown through the display device. To do so, the transparent display apparatus had been suggested for providing the video information from the display device with the background scene passing through the display apparatus, at the same time.

Since the transparent display apparatus according to the related art always provides a background scene, the background scene often hinders an observer to properly recognize the video information provided from the display itself. The transparent display apparatus may provide an optimal function according to a usage environment. On the contrary, a function of providing video information, which is the main purpose of the display apparatus, may be rather degraded.

SUMMARY

The purpose of the present disclosure, as for solving the problems described above, is to provide a multi-purpose display in which, in accordance of user's selection, the display may be used as a transparent display apparatus for providing the video information with the background scene, or the display may be used as a display apparatus for providing the video information only by disabling the transparent function. Another purpose of the present disclosure is to provide a transparent display apparatus including a light shutter panel having a light blocking function and a light transparenting function, and a transparent display panel disposed front of the light shutter panel for providing video information with the background scene selectively passing the light shutter panel. Still another purpose of the present disclosure is to provide a light shutter panel having a light blocking mode and a light transparenting mode, wherein, for the light transparenting mode, a light transmittance ratio of the light shutter panel is at least 70% of total light intensity provided from the backside of the light shutter panel, and to provide a transparent display apparatus having the same light shutter panel. Yet another purpose of the present disclosure is to provide a transparent display apparatus in which, a distortion of the video information due to the background light intensity may be reduced by completely blocking the light provided from the backside of the light shutter panel, for the light transparenting mode.

In order to accomplish the above mentioned purposes of the present disclosure, a light shutter panel according to the present disclosure comprises: a first light shutter panel including: a first lower electrode plate; a first upper electrode plate facing with the first lower electrode plate; a first shutter layer disposed between the first lower electrode plate and the first upper electrode plate, and including first maximum light transmitting portion, a first minimum light blocking portion, first ink storage portions connecting the first maximum light transmitting portion and the first minimum light blocking portion and a first electric field guide disposed between first ink storage portions; a plurality of first spacers maintaining a gap between the first lower electrode plate and the first upper electrode plate; and a first black ink filled into the first ink storage portion of the first shutter layer, and a second light shutter panel including: a second lower electrode plate; a second upper electrode plate facing with the second lower electrode plate; a second shutter layer disposed between the second lower electrode plate and the second upper electrode plate, and including second maximum light transmitting portion, a second minimum light blocking portion, second ink storage portions connecting the second maximum light transmitting portion and the second minimum light blocking portion and a second electric field guide disposed between second ink storage portions; a plurality of second spacers maintaining a gap between the second lower electrode plate and the second upper electrode plate; and a second black ink filled into the second ink storage portion of the second shutter layer, wherein the first light shutter panel and the second light shutter panel are joined in a thickness direction, wherein the first minimum light blocking portion and the second minimum light blocking portion are overlapped each other, and wherein the first spacers are not overlapped with the second spacers.

In one embodiment, the first lower electrode plate includes: a first lower transparent substrate; and a first lower transparent electrode layer disposed on the whole upper surface of the first lower transparent substrate. The first upper electrode plate includes: a first upper transparent substrate; and a first upper transparent electrode layer disposed on the whole upper surface of the first upper transparent substrate. The first lower electrode plate and the first upper electrode plate are joined each other as facing the first lower transparent electrode layer and the first upper transparent electrode layer. The second lower electrode plate includes: a second lower transparent substrate; and a second lower transparent electrode layer disposed on the whole upper surface of the second lower transparent substrate. The second upper electrode plate includes: a second upper transparent substrate; and a second upper transparent electrode layer disposed on the whole upper surface of the second upper transparent substrate. The second lower electrode plate and the second upper electrode plate are joined each other as facing the second lower transparent electrode layer and the second upper transparent electrode layer.

In one embodiment, the first ink storage portion has a first profile in which a first cross sectional shape of the first ink storage portion extends from the first minimum light blocking portion to the first maximum light transmitting portion, and a first cross sectional area of the first ink storage portion increases gradually. The first electric field guide extends from the first maximum light transmitting portion to the first minimum light blocking portion, and a first cross sectional area of the first electric field guide decreases gradually. The second ink storage portion has a second profile in which a second cross sectional shape of the second ink storage portion extends from the second minimum light blocking portion to the second maximum light transmitting portion, and a second cross sectional area of the second ink storage portion increases gradually. The second electric field guide extends from the second maximum light transmitting portion to the second minimum light blocking portion, and a second cross sectional area of the second electric field guide decreases gradually.

In one embodiment, an area of the first minimum light blocking portion is 30% than an area of the first maximum light transmitting portion, at most, and an area of the second minimum light blocking portion is 30% than an area of the second maximum light transmitting portion, at most.

In one embodiment, a height of the first electric field guide is in a range of 50% to 90% of a height of the first spacer, and a height of the second electric field guide is in a range of 50% to 90% of a height of the second spacer.

In one embodiment, the first black ink and the second black ink include: a transparent fluid; and a plurality of charge black particles evenly dispersed into the transparent fluid.

In one embodiment, a common terminal for supplying a common voltage is connected to the first upper transparent electrode layer and the second upper transparent electrode layer, a driving terminal for supplying a driving voltage is connected to the first lower transparent electrode layer and the second lower transparent electrode layer, and the charged black particles are charged with ions having the same polarity of the common voltage.

In one embodiment, the first upper transparent substrate is attached to the second upper transparent substrate.

In one embodiment, the first upper transparent substrate is attached to the second lower transparent substrate.

A light shutter panel according to the present disclosure comprises: a lower electrode plate; a common electrode plate disposed as facing with the lower electrode plate; a upper electrode plate disposed as facing with the common electrode plate; a lower shutter layer disposed between the lower electrode plate and the common electrode plate, the lower shutter layer including a first maximum light transmitting portion, a first minimum light blocking portion, a first electric field guide connecting the first maximum light transmitting portion and the first minimum light blocking portion, and a first ink storage portion disposed between the first electric field guides; a upper shutter layer disposed between the upper electrode plated and the common electrode plate, the upper shutter layer including a second maximum light transmitting portion, a second minimum light blocking portion, a second electric field guide connecting the second maximum light transmitting portion and the second minimum light blocking portion, and a second ink storage portion disposed between the second electric field guides; a plurality of first transparent spacers maintaining a first gap between the lower electrode plate and the common electrode plate, uniformly; a plurality of second transparent spacers maintaining a second gap between the upper electrode plate and the common electrode plate, uniformly; a first black ink filled into the first ink storage portion; and a second black ink filled into the second ink storage portion.

In one embodiment, the first transparent spacers are not overlapped with the second transparent spacers.

In one embodiment, the lower electrode plate includes: a lower transparent substrate; and a lower transparent electrode layer deposited on a whole upper surface of the lower transparent substrate. The upper electrode plate includes: an upper transparent substrate; and an upper transparent electrode layer deposited on a whole upper surface of the upper transparent substrate. The common electrode plate includes: a common transparent substrate; and common transparent electrode layers deposited on a whole upper surface and lower surface of the common transparent substrate. The lower electrode plate and the upper electrode plate are joined each other as the lower transparent electrode layer and the upper transparent electrode layer are facing each other with the common electrode plate therebetween.

In one embodiment, the first electric field guide extends from the first minimum light blocking portion to the first maximum light transmitting portion, and a cross sectional area of the first electric field guide decreases gradually. The first ink storage portion extends from the first minimum light blocking portion to the first maximum light transmitting portion, and a cross sectional area of the first ink storage portion increases gradually. The second electric field guide extends from the second minimum light blocking portion to the second maximum light transmitting portion, and a cross sectional area of the second electric field guide decreases gradually. The second ink storage portion extends from the second minimum light blocking portion to the second maximum light transmitting portion, and a cross sectional area of the second ink storage portion increases gradually.

In one embodiment, an area of the first minimum light blocking portion is 30% than an area of the first maximum light transmitting portion, at most, and an area of the second minimum light blocking portion is 30% than an area of the second maximum light transmitting portion, at most.

In one embodiment, a height of the first electric field guide is in a range of 50% to 90% of a height of the first spacer, and a height of the second electric field guide is in a range of 50% to 90% of a height of the second spacer.

In one embodiment, the first black ink includes: a first transparent fluid; and a plurality of first charge black particles evenly dispersed into the first transparent fluid. The second black ink includes: a second transparent fluid; and a plurality of second charge black particles evenly dispersed into the second transparent fluid.

In one embodiment, the first charged black particle and the second charged black particle have different polarities each other.

In one embodiment, a driving terminal for supplying a positive driving voltage is connected to the upper electrode plate and the lower electrode plate, a common terminal for supplying a negative common voltage is connected to the common electrode plate, and the first charged black particles are charged with negative ions, and the second charged black particles are charged with positive ions.

Further, a transparent display apparatus according to the present disclosure comprises: a transparent display panel including a plurality of pixels in a matrix manner, each of pixel including an emission area and a transmission area; and a light shutter panel including: a lower electrode plate; an upper electrode plate facing with the lower electrode plate; a shutter layer disposed between the lower electrode plate and the upper electrode plate, and including maximum light transmitting portion, a minimum light blocking portion, ink storage portions connecting the maximum light transmitting portion and the minimum light blocking portion and an electric field guide disposed between ink storage portions; a plurality of spacers maintaining a gap between the lower electrode plate and the upper electrode plate; and a black ink filled into the ink storage portion of the shutter layer.

A light shutter panel according to the present disclosure comprises an upper electrode layer, a lower electrode layer, an electric field guide having a minimum light blocking portion and a maximum light transmitting portion, an ink storing portion and a charged black ink filled in the ink storing portion. When driving the charge black ink by applying an electric field between the upper electrode layer and the lower electrode layer, the present disclosure may provide an electric field which does not have any distorted portion by the shape of the electric field guide. In the transparent mode, the charged black ink may be gathered within the minimum light blocking portion, so that there is no degradation of transmittance caused by that the charged black ink is not concentrated within a predetermined area (i.e., the minimum light blocking portion) due to the electric field distortion. Further, by setting the cross-sectional area of the minimum light blocking portion to less than 30% of the maximum light transmitting portion, the transmittance ratio may be guaranteed to 70% or more.

In addition, the light shutter panel according to the present disclosure may be configured two of unit light shutter panels having the same structure. For example, joined two of unit light shutter panels by arranging the minimum light blocking portions to overlap each other, the light shutter panel may have high transmittance ratio without any reduction of minimum light transmittance ratio (70%) of unit light shutter panel. When transparent spacers are applied into the light shutter panel in order to ensure the high ratio of the light transmittance, in the light blocking mode, the light leakage may be occurred by the scattering phenomena as the lights are passing the transparent spacers. However, the light shutter panel according to the present disclosure may ensure the maximum light blocking ratio by joining two of unit light shutter panels as arranging the transparent spacers of the two of unit light shutter panels are not overlapped each other.

Consequently, a transparent display apparatus according to the present disclosure may provide the background scene with sufficient brightness in the transparent mode, and may provide the video information only without any distortions by fully blocking the lights from the background scene.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
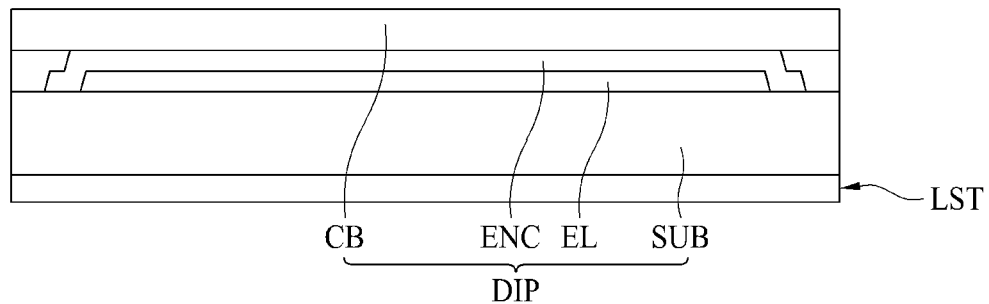
FIG. 1 is a cross sectional view illustrating a transparent display apparatus according to the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part may also be present unless "only" is used. The terms in a singular form may include plural forms unless noted to the contrary.

In construing an element, the element is construed as including an error range although there is no explicit description.

In describing a positional relationship, for example, when the positional order is described as "on," "above," "below," and "next," the case of no contact there-between may be included, unless "just" or "direct" is used. If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as the first, the second, A, B, (a) and (b) may be used. These terms are only to distinguish the elements from other elements, and the terms are not limited in nature, order, sequence or number of the elements. When an element is described as being "linked", "coupled" or "connected" to another element that element may be directly connected to or connected to that other element, but indirectly unless otherwise specified. It is to be understood that other elements may be "interposed" between each element that may be connected to or coupled to.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

Hereinafter, an example of a display apparatus according to the present disclosure will be described in detail with reference to the accompanying drawings. In designating reference numerals to elements of each drawing, the same components may have the same reference numerals as much as possible even though they are shown in different drawings. Scale of the elements shown in the accompanying drawings have a different scale from the actual for convenience of description, it is not limited to the scale shown in the drawings.

Figure 2:
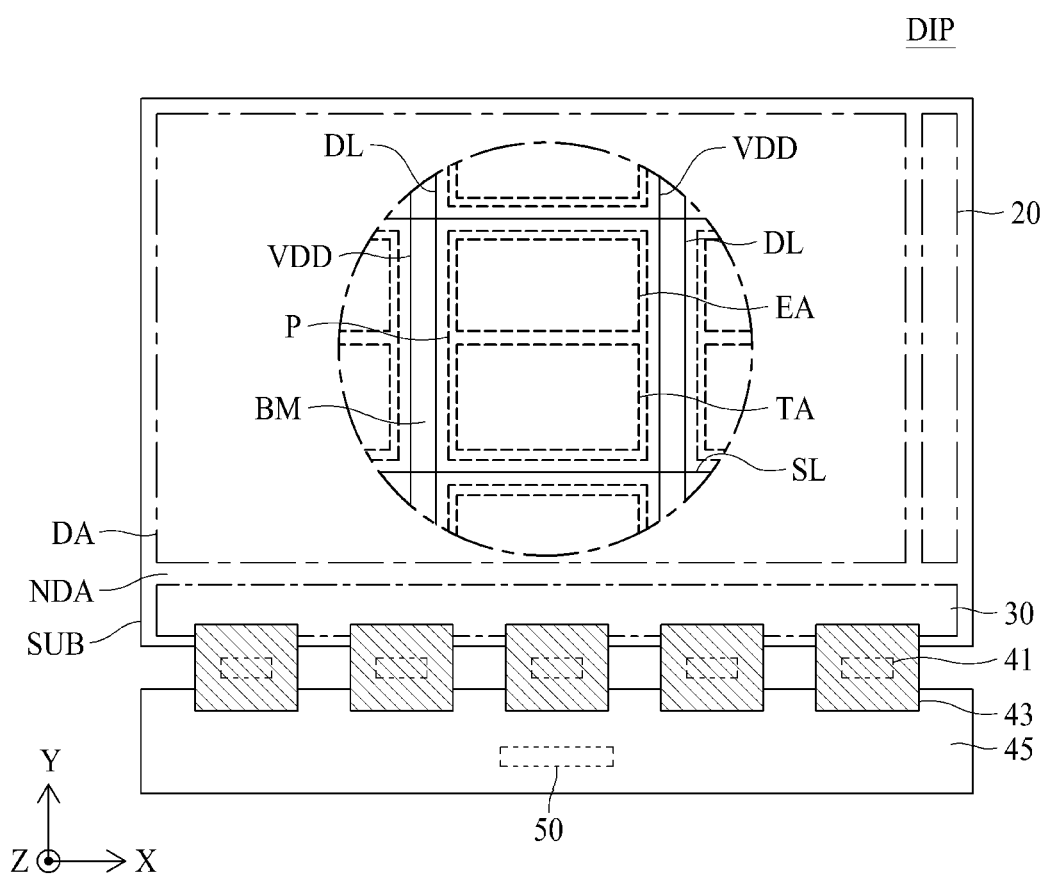
FIG. 2 is a plane view illustrating a transparent display panel of the transparent display apparatus according to one embodiment of the present disclosure.

Hereinafter, referring to FIGS. 1 and 2, a transparent display apparatus according to the present disclosure will be explained. FIG. 1 is a cross sectional view illustrating a transparent display apparatus according to the present disclosure. FIG. 2 is a plane view illustrating a transparent display panel of the transparent display apparatus according to one embodiment of the present disclosure.

Referring to FIG. 1, a transparent display apparatus according to the present disclosure comprises a transparent display panel DIP and a light shutter panel LST. The light shutter panel LST may be attached at the rear surface of the transparent display panel DIP. The light shutter panel LST may be an optical panel which is selectively operated in a light transmitting mode for transmitting the light through the optical panel or in a light blocking mode for blocking the light not to be passing the optical panel. For example, in the light transmitting mode, the light incident from the rear side is transmitted almost through the optical panel, so the background scene may be acknowledged from the front side of the optical panel, as it may be a glass. On the contrary, in the light blocking mode, almost of all light incident from the rear side into the optical panel are blocked, so the background scene may be not invisible in front side of the optical panel, as it was covered with blinds or curtain.

The transparent display panel DIP may include a transparent substrate SUB, a display layer EL formed on the transparent substrate SUB, an encapsulation layer ENC covering the display layer EL, and a cover plate CB disposed on the encapsulation layer ENC.

The transparent display panel DIP may be any one selected display panel of a liquid crystal display panel, a plasma display panel, and an electroluminescent display panel. For the case that the electroluminescent display panel is used, the transparent display panel DIP may include a self-luminescent display panel or a curved self-luminescent display panel. In detail, the transparent display panel DIP may include a light emitting display panel, a micro light emitting display panel, a flexible light emitting display panel, a flexible micro light emitting display panel, or a quantum dot display panel.

The transparent substrate SUB of the transparent display panel DIP may be made of a transparent material. The display layer EL may include a plurality of pixel areas (or pixels) P arrayed in a matrix manner. Each pixel area P may include a driving element (not shown) and a light emitting element (not shown). The driving element may include thin film transistors and a storage capacitor. The light emitting element may be an electroluminescent element of which luminescent may be controlled by the driving element. The electroluminescent element may include an organic light emitting diode or an inorganic light emitting diode.

The encapsulation layer ENC may be protecting the display layer EL and prevents gases or foreign materials from intruding from the outside. The encapsulation layer ENC may have a structure in which an inorganic layer and an organic layer are alternately stacked. In one embodiment, the encapsulation layer ENC is formed of a transparent material.

The cover plate CB may be a plate or substrate having a high strength and transparent property such as a glass or plastic. For example, the cover plate CB may be a transparent protective plate for preventing or reducing the encapsulation layer ENC and display layer EL from being damaged from the external impacts.

Hereinafter, referring to FIG. 2, a plane structure of the transparent display panel DIP will be explained. The transparent display panel DIP may include a transparent substrate SUB, a gate (or scan) driver 20, a data pad portion 30, a source driving integrated circuit 41, a flexible wiring film 43, a circuit board 45 and a timing controller 50.

The transparent substrate SUB may include a display area DA and a non-display area NDA. The display area DA is for representing video information, and may be defined in most of the middle portion of the transparent substrate SUB, but it is not limited thereto. The display area DA may include a plurality of pixel areas P arrayed in a matrix manner. Each of the pixel areas P may have a rectangular shape surrounded by a scan line (or gate line) SL, a data line DL and a driving current line VDD. Even though it is not shown in figure, each pixel area P may include a switching thin film transistor, a driving thin film transistor, a storage capacitor and an organic light emitting diode.

The transparent substrate SUB may include a plurality of pixel P arrayed in a matrix manner. Each pixel P may have an emission area EA and a transmission area TA. Each pixel P may further include a non-emission area BM. For example, between two pixels P, the non-emission area BM may be disposed. For example, between two neighboring pixels P, a black matrix (non-emission area) BM having a predetermined width may be disposed. That is, a plurality of pixels P are arrayed in a matrix matter, a non-emission area BM having a mesh shaped black matrix is disposed between pixels P. In some cases, the area excepting the non-emission area BM may be defined as the pixel P.

A pixel P, in the area excepting the transmission area TA, may include an organic light emitting diode, a switching thin film transistor, a driving thin film transistor, a storage capacitor, a scan line SL, a data line DL and a driving current line VDD. For an example, the scan line SL, the data line DL and the driving current line VDD for defining the pixel area P may be disposed at the non-emission area BM. The switching thin film transistor, the driving thin film transistor, the storage capacitor and the organic light emitting diode may be disposed in the emission area EA. For another example, the scan line SL, the data line DL, the driving current line VDD and the switching thin film transistor may be disposed at the non-emission area BM, and the driving thin film transistor, the storage capacitor and the organic light emitting diode may be disposed in the emission area EA.

An emission area EA may represent one color of light. For an example, any one-color of light such as red, green or blue may be generated from one emission area EA. Three pixels P, each pixel having an emission area EA representing one-color of light and a transmission area TA, may be gathered or grouped to form one unit pixel. Even though it is not shown in figure, for another example, an emission area EA may include any one-color of light selected from red, green, blue and white color light. In this case, four pixels P representing 4 different colors of light in each pixel may be grouped to form one unit pixel.

The non-display area NDA is an area in which the video information is not displayed, and may be defined at the circumference area of the transparent substrate SUB as surrounding all or some portions of the (DA). The non-display area NDA may include the gate driver 20 and the data pad portion 30.

The gate driver 20 may supply the scan (or gate) signal to the scan lines in accordance with the gate control signal received from the timing controller 50. The gate driver 20 may be formed in the non-display area NDA disposed at one side of the display area DA on the transparent substrate SUB with the GIP (Gate driver In Panel) type. The GIP type may refer to a structure in which a gate driver 20 including thin film transistors and capacitors is directly formed on the transparent substrate SUB.

The data pad portion 30 may supply the data signals to the data lines DL in accordance with the data control signal received from the timing controller 50. The data pad portion 30 may be formed as a chip type and mounted on the flexible wiring film 43. The flexible wiring film 43 may be attached at the non-display area NDA disposed at one outside of the display area DA of the transparent substrate SUB by the TAB (Tape Automated Bonding) method.

The source driving integrated circuit 41 may receive the digital video data and the source control signals from the timing controller 50. The source driving integrated circuit 41 may covert the digital video data into the analog data voltages in accordance with the source control signal, and supply the analog data voltages to the data lines DL. When the source driving integrated circuit 41 is formed as a chip type, it may be mounted on the flexible wiring film 43 by the COF (Chip On Film) method or COP (Chip On Plastic) method.

The flexible wiring film 43 may include wirings for connecting the data pad portion 30 to the source driving integrated circuit 41, and for connecting the data pad portion 30 to the circuit board 45. The flexible wiring film 43 may be mounted on the data pad portion 30 using an anisotropic conducting film, so the data pad portion 30 may be connected to the wirings of the flexible wiring film 43.

The circuit board 45 may be attached to the plurality of flexible wiring films 43. The circuit board 45 may have a plurality of circuits represented in the driving chip type. For example, the timing controller 50 may be mounted on the circuit board 45. The circuit board 45 may be a printed circuit board or a flexible printed circuit board.

The timing controller 50 may receive the digital video data and the timing signals from an external system board through a cable connected to the circuit board 45. The timing controller 50 may generate the gate control signals for controlling the operation timing of the gate driver 20 and the source control signals for controlling the source driving integrated circuit 41, based on the timing signals. The timing controller 50 may supply the gate control signals to the gate driver 20, and supply the source control signal to the source driving integrated circuit 41. In some cases, the timing controller 50 may be manufactured in one driving chip as including the source driving integrated circuit 41 and then mounted on the transparent substrate SUB.

The timing controller 50 may be connected to the light shutter panel LST. According to the input of the user and in conjunction with the operation of the transparent display panel DIP, the light shutter panel LST may be operated in the light transmitting mode or in the light blocking mode. In one example, even though it is not shown in figure, the timing controller 50 may be connected to the voltage supplier configured to supply the electric driving voltage in accordance with the operation mode of the light shutter panel LST.

The transparent display panel DIP may include an emission area EA providing the video information and a transmission area TA passing through the background scene of the display panel as it is. The arrangement of the emission area EA and the transmission area TA may be variously configured on the transparent substrate SUB.

Figure 3A:
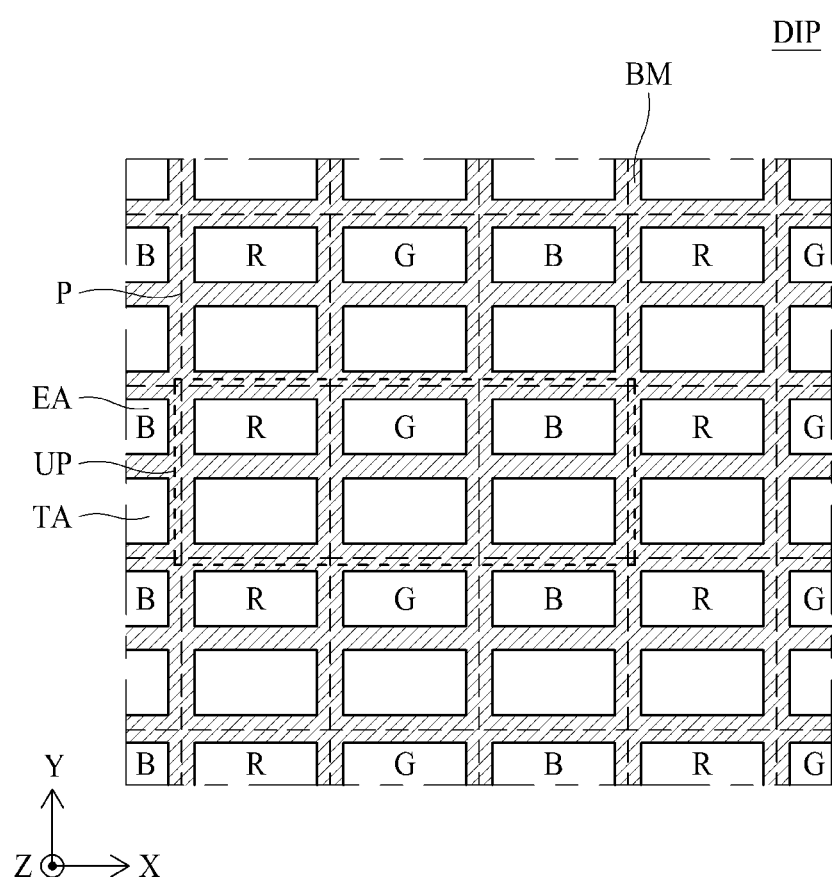
FIGS. 3A to 3C are plane views illustrating various pixel structures of the transparent display apparatus according to the present disclosure.
Figure 3B:
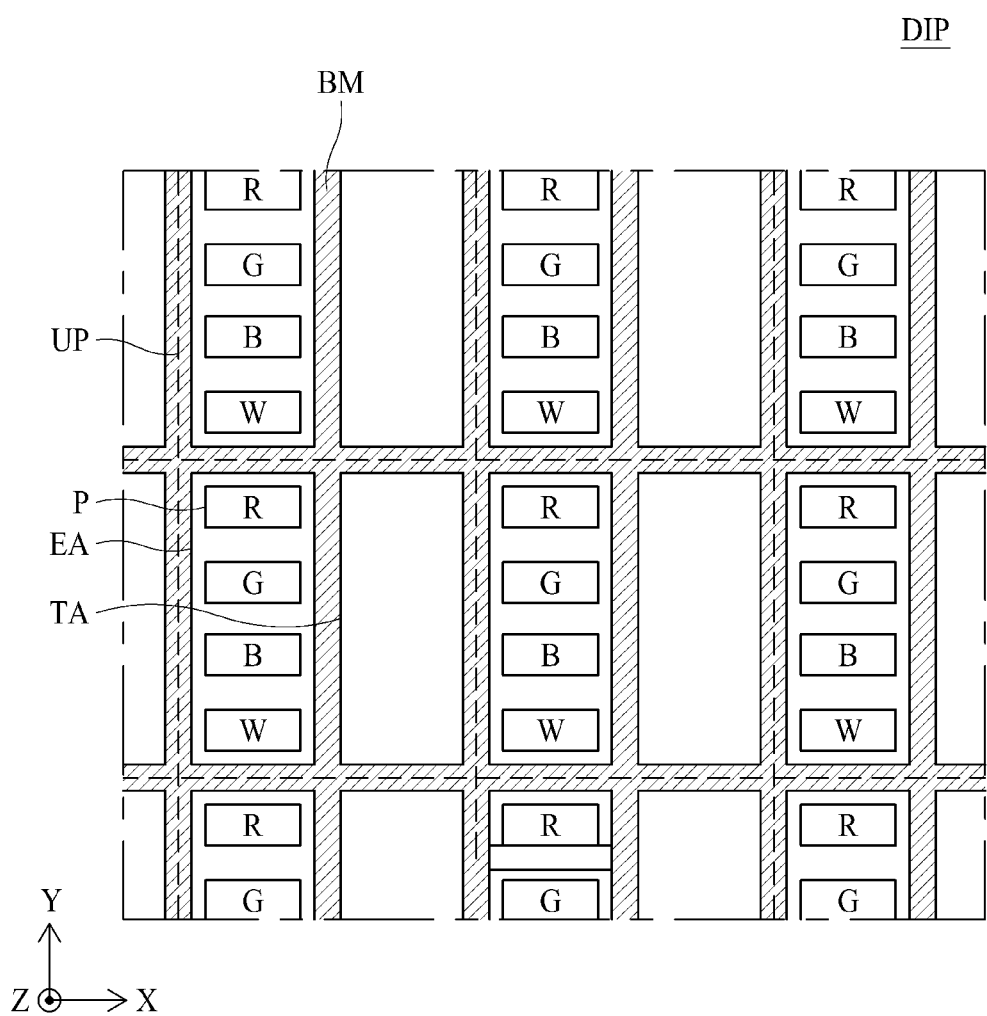
Figure 3C:
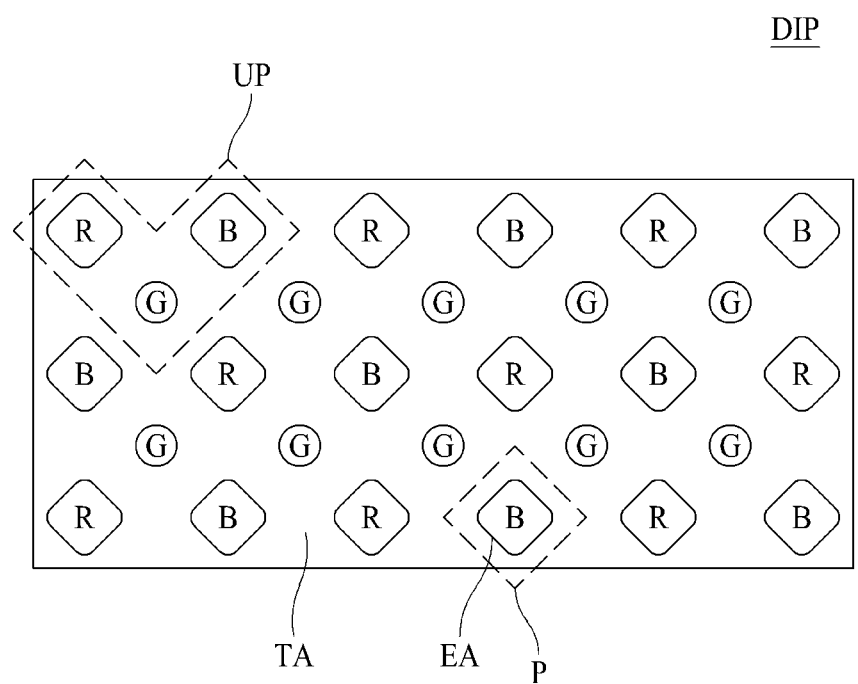

Hereinafter, referring to FIGS. 3A to 3C, various embodiments for the emission area EA, transmission area TA and non-emission area BM in the transparent display panel DIP will be explained. FIGS. 3A to 3C are plane views illustrating various pixel structures of the transparent display apparatus according to the present disclosure.

In one example, as shown in FIG. 3A, a plurality of pixels P may be disposed in a matrix manner. A pixel P may include an emission area EA and a transmission area TA. A non-emission area BM may be disposed as surrounding the emission area EA and the transmission area TA, so the non-emission area BM may have the mesh shape over the whole surface of the transparent substrate SUB.

Each emission area EA included in the three pixels P arrayed in series may be allocated with any one of a red-light emitting element R, a green light emitting element G and a blue light emitting element B. These three pixels P are grouped with each other to form a unit pixel UP. FIG. 3A shows the case in which a red-light emitting element R, a green light emitting element G and a blue light emitting element B are allocated at the three consecutive pixels P along the horizontal direction (X-axis). In this case, along the vertical direction (Y-axis), the same color pixels are disposed. The transmission area TA may have a horizontal striped shape along the X-axis, and arrayed along the vertical direction (Y-axis).

In another example, as shown in FIG. 3B, a plurality of unit pixels UP is arrayed in a matrix manner. In a unit pixel UP, an emission area EA and a transmission area TA may be defined. Further, a non-emission area BM may be disposed as surrounding the emission area EA and the transmission area TA.

In the emission area EA of any one of unit pixel UP, four pixels P may be disposed. These four pixels P are successively arrayed along the vertical direction (Y-axis) in one-unit pixel UP. In one example, four pixels P may be allocated as being arrayed with a red-light emitting element R, a green light emitting element G, a blue light emitting element B and a white light emitting element W. In another example, the non-emission area BM may be further included between the pixels P.

In this case, the emission area EA may have a vertical striped shape along the vertical direction (Y-axis) and be arrayed along the horizontal direction (X-axis). Further, the transmission area TA may have a vertical striped shape along the vertical direction (Y-axis) and be arrayed along the horizontal direction (X-axis).

In still another example, as shown in FIG. 3C, a plurality of emission areas EA are disposed in a pentile manner. In this case, the emission areas EA may have different size each other. For one example, the emission areas EA allocated with the red light emitting element R and the blue light emitting element B may have a first size, the emission area EA allocated with the green light emitting element G may have a second size less than the first size.

In addition, the shapes of the emission areas EA may have different shapes from each other. For example, the emission area EA allocated with the red-light emitting element R and the blue light emitting layer B may have polygonal shapes such as a rectangular shape, a rhombus shape or hexagonal shape. On the contrary, the emission area EA allocated with the green light emitting element G may have a circular shape. The pixel P including the red-light emitting element R or the green light emitting element G may be defined as the rhombus shapes.

In addition, the red-light emitting element R, the blue light emitting element B and the green light emitting element G may disposed as forming a triangular shape. For example, the unit pixel UP may have a 'v' shape or a 'Λ' shape.

In the above various examples, the arrangement structures of the emission area EA and the transmission area TA according to three different types. However, it is not restricted therefor, further various type may be applied.

Hereinafter, referring to figures, the light shutter panel LST will be explained in detail. The light shutter panels LST according to following examples may disposed at the rear side of the transparent display panels DIP explained above, for tranpassing the lights and for blocking the lights incident from the rear side of the transparent display panel DIP, selectively.

First Embodiment

Figure 4A:
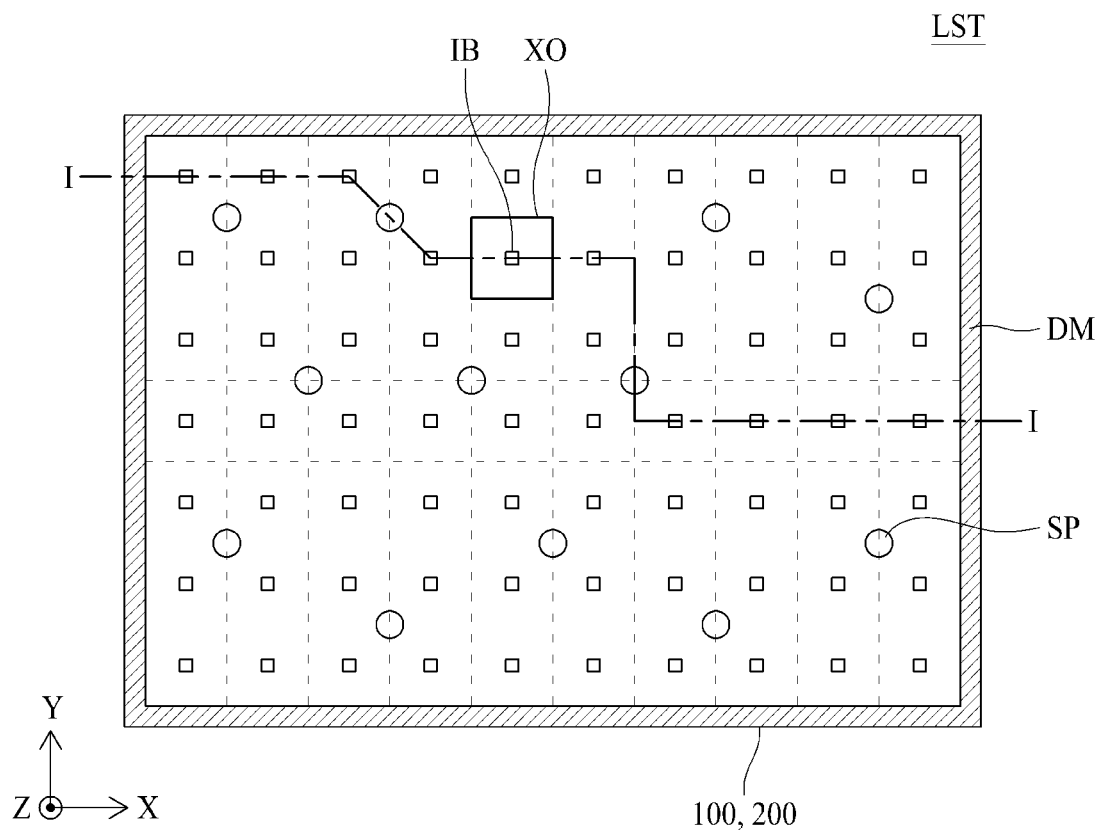
FIG. 4A is a plane view illustrating a structure of the light shutter panel according to the first embodiment of the present disclosure.
Figure 4B:
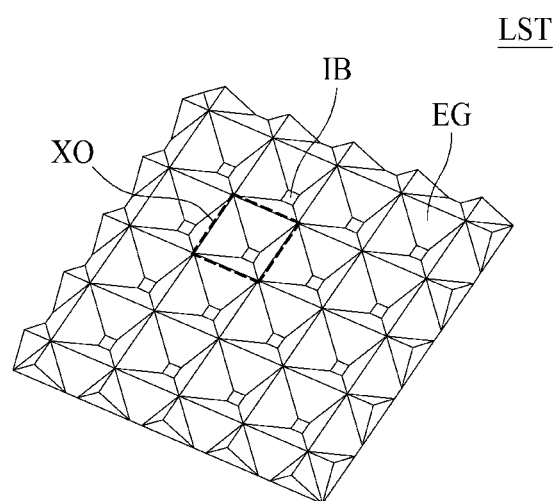
FIG. 4B is a perspective view illustrating a structure of the light shutter panel according to the first embodiment of the present disclosure.
Figure 5:
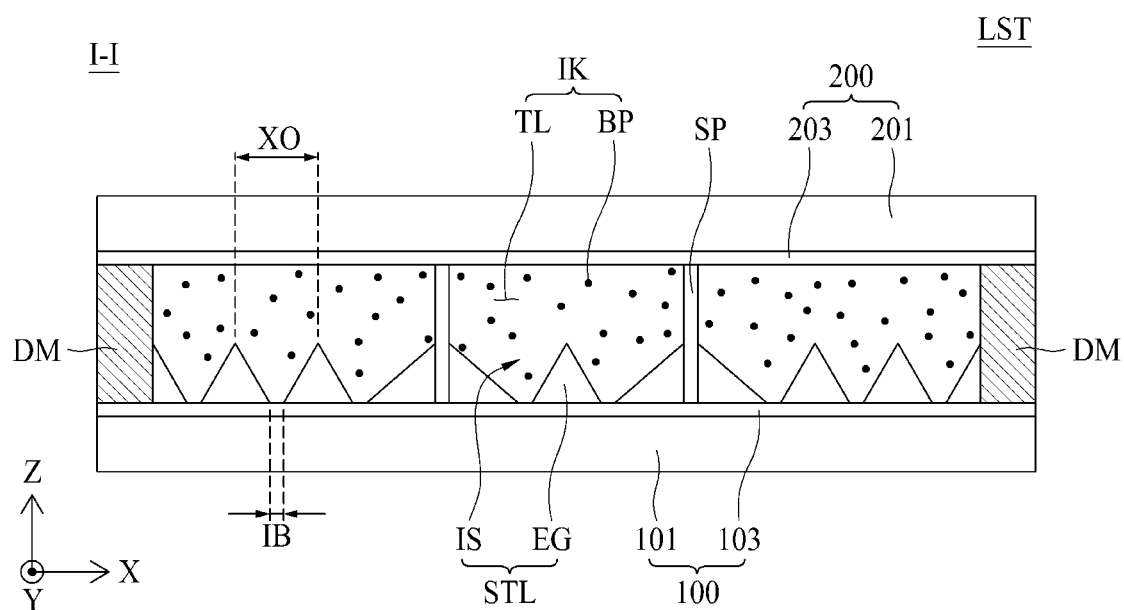
FIG. 5 is a cross-sectional view, along cutting line I-I in FIG. 4A, illustrating a structure of the light shutter panel according to the first embodiment of the present disclosure.

Hereinafter, referring to FIGS. 4A and 4B and FIG. 5, a light shutter panel LST according to the first embodiment of the present disclosure will be explained. FIG. 4A is a plane view illustrating a structure of the light shutter panel according to the first embodiment of the present disclosure. FIG. 4B is a perspective view illustrating a structure of the light shutter panel according to the first embodiment of the present disclosure. FIG. 5 is a cross-sectional view, along cutting line I-I in FIG. 4A, illustrating a structure of the light shutter panel according to the first embodiment of the present disclosure.

The light shutter panel LST according to the first embodiment of the present disclosure may include a lower electrode plate 100, an upper electrode plate 200, a shutter layer STL, a spacer SP and black ink IK. The lower electrode plate 100 and the upper electrode plate 200 may be joined as to be faced each other with a predetermined interval. For example, the lower electrode plate 100 and the upper electrode plate 200 may be bonded each other using a dam structure DM disposed at the circumference area of them.

The shutter layer STL may be disposed between the lower electrode plate 100 and upper electrode plate 200. The shutter layer STL may include a maximum light transmitting portion XO, a minimum light blocking portion IB, an ink storage portion IS and an electric field guide EG. The ink storage portion IS may be a space formed between the maximum light transmitting portion XO and the minimum light blocking portion IB. A plurality of the ink storage portions IS may be arrayed in succession, the electric field guide EG may be disposed between the neighboring two ink storage portions IS. Accordingly, the electric field guide EG may be made of a transparent material as being a structure (or structural body) connecting the maximum light transmitting portion XO and minimum light blocking portion IB. The ink storage portion IS may be defined as a space surrounded by the electric field guides EG.

A plurality of transparent spacers SP are distributed between the lower electrode plate 100 and the upper electrode plate 200 for maintaining a constant gap between them. That is, the constant gap between the lower electrode plate 100 and the upper electrode plate 200 may be defined by the heights of the dam structure DM and the transparent spacer SP. The light shutter panel LST may be an optical element for selectively being operated in the light blocking mode, or in the light transmitting mode. For an example, the light shutter panel LST according to the present disclosure may be applied to a transparent display apparatus in which the light transmittance ratio is considered as the most important factor in the light transmitting mode. In this case, it is preferable that the spacer SP may be formed of a transparent material. However, it is not limited thereto, for the case that the light transmittance ratio is not so important factor. In that case, the spacer SP may be made of an opaque material.

The black ink IK may be filled in the ink storage portion IS of the shutter layer STL. The black ink IK may include a transparent fluid TL and a charged black particle BP dispersed into the transparent fluid TL. The transparent fluid TL may be an uncharged liquid such as a pure water. The charged black particles BP may be charged with negative ion or positive ion, and evenly dispersed into the transparent fluid TL. By applying an electric field to the black ink IK, the distribution state of the charged black particle BP may be shifted so as to be concentrated to any one place. For example, the charged black particle BP may be an electrophoretic material.

For one example, in a state that an electric field is not applied, the charged black particles BP may be evenly distributed or dispersed in the ink storage portion IS, so that the whole area of the ink storage portion IS may be in a light blocking state. When an electric field is applied so as for concentrating the charged black particles BP into the minimum light blocking portion IB, the most area of the ink storage portion IS may be in the light transmitting state. Here, the transparent spacer SP and the charged black ink IK may be referred to the element included in the shutter layer STL.

The lower electrode plate 100 may include a lower transparent substrate 101 and a lower transparent electrode layer 103. The lower transparent substrate 101 may be a transparent substrate such as a glass or plastic substrate. In some cases, the lower transparent substrate 101 may be made in a film type having excellent flexibility. The lower transparent substrate 101 of the lower electrode plate 100 may have a rectangular plate structure including a first axis (or horizontal axis) X and a second axis (or vertical axis) Y.

The lower transparent electrode layer 103 may be deposited on the whole upper surface of the lower transparent substrate 101. The lower transparent electrode layer 103 may include a transparent conductive material such as an indium-tin oxide (ITO), indium-zinc oxide (IZO) or indium-gallium-zinc oxide (IGZO). Even though it is not shown in figures, a protective layer may be stacked on the whole upper surface of the lower transparent electrode layer 103.

The upper electrode plate 200 may have a shape and an area the same with those of the lower electrode plate 100. The upper electrode plate 200 may include an upper transparent substrate 201 and an upper transparent electrode layer upper transparent electrode layer 203. The upper transparent substrate 201 of the upper electrode plate 200 may have a rectangular plate structure including a first axis (or horizontal axis) X and a second axis (or vertical axis) Y. The upper transparent electrode layer 203 may be deposited on the whole upper surface of the upper transparent substrate 201. The upper transparent electrode layer 203 may include a transparent conductive material. The lower electrode plate 100 and the upper electrode plate 200 may be joined each other as that the lower transparent substrate 101 and the upper transparent substrate 201 are face each other.

Hereinafter, the electric field guide EG and the ink storage portion IS will be explained in detail. The electric field guide EG may include a lower plane surface at the bottom part, and an apex side at the upper part. The lower plane surface may be disposed on the lower transparent electrode layer 103, and the upper part may be disposed toward the upper transparent electrode layer 203.

For an example, the electric field guide EG may have a triangular pillar shape. The one side surface of the triangular pillar shape may be disposed on the lower electrode plate 100. A plurality of triangular pillars are arrayed with a predetermined distance. In some cases, a plurality of triangular pillars are arrayed in a crossed structure as disposed along the X axis and the Y axis. As the electric field guides EG having the triangular pillar shapes are disposed with a predetermined distance, the exposed area by the predetermined distance may be defined as the minimum light blocking portion IB. the upper area surrounded by the apex sides of the triangular pillars may be defined as the maximum light transmitting portion XO.

In one embodiment, the apex sides of the electric field guide EG are apart from the upper transparent electrode layer 203 with a predetermined distance. In one embodiment, the height of the electric field guide EG may correspond to the 50% to 90% of the gap between the lower transparent electrode layer 103 and upper transparent electrode layer 203. Further, the apex side may have not the sharply pointed shape but the rounded shape. In one embodiment, the apex side may have a convex shape to upper direction, rather than a plane shape or a concaved shape.

A plurality of electric field guides EG are arrayed in a matrix manner with a predetermined distance. The ink storage portion IS may be defined by the volume excepting the electric field guide EG in the space between the lower electrode plate 100 and upper electrode plate 200. Accordingly, the minimum light blocking portion IB may be defined by the distance between the neighboring bottom surface of the electric field guides EG. Further, the maximum light transmitting portion XO may be defined by the distance between the neighboring apex sides of the electric field guides EG.

In one example, the ink storage portion IS may have a shape in which a square truncated cone is inverted. However, it is not restricted thereto, it may have the shape of a truncated cone, or a polygonal truncated shape such as a hexagonal or octagonal pyramid. That is, the ink storage portion IS may have an inverted square truncated cone shape with the minimum light blocking portion IB as a bottom surface, the maximum light transmitting portion XO as an upper surface, and the electric field guide EG as an oblique surface.

In the case that the height of the electric field guide EG is smaller than the gap between the lower electrode plate 100 and the upper electrode plate 200, the space between the electric field guide EG and the upper electrode plate 200 may be also included in the ink storage portion IS. Therefore, the ink storage portion IS may have a profile in which the cross-sectional area is gradually increased as going from the minimum light blocking portion IB to the maximum light transmitting portion XO. Further, the electric field guide EG may have a profile in which the cross-sectional area is gradually decreased as going from the maximum light transmitting portion XO to the minimum light blocking portion IB.

In one embodiment, the area of the minimum light blocking portion IB may be 30% of the area of the maximum light transmitting portion XO, at maximum. In this case, as the light amount incident into the whole surface of the light shutter panel LST refers to 100%, the light amount transmitting the light shutter panel LST in the light transmitting mode may be ensured in 70% of the incident light amount, at least. That is, the area ratio of the minimum light blocking portion IB to the maximum light transmitting portion XO may be a major factor determining the light transmittance ratio of the light shutter panel LST.

Figure 6A:
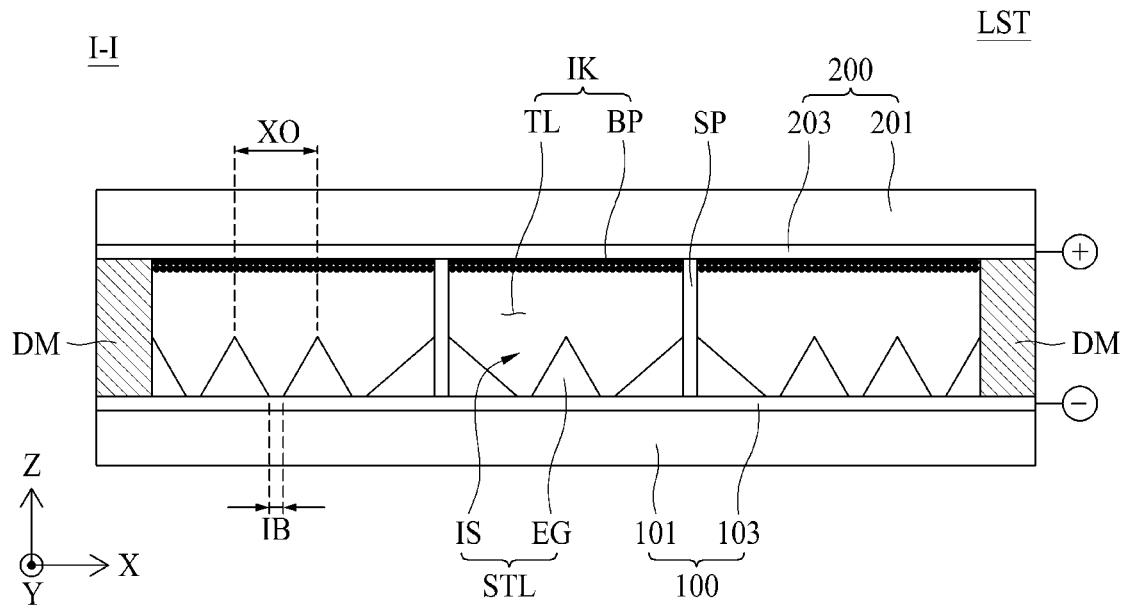
FIGS. 6A and 6B are cross-sectional views, along cutting line I-I in FIG. 4A, illustrating the operations of the light shutter panel according to the first embodiment of the present disclosure.
Figure 6B:
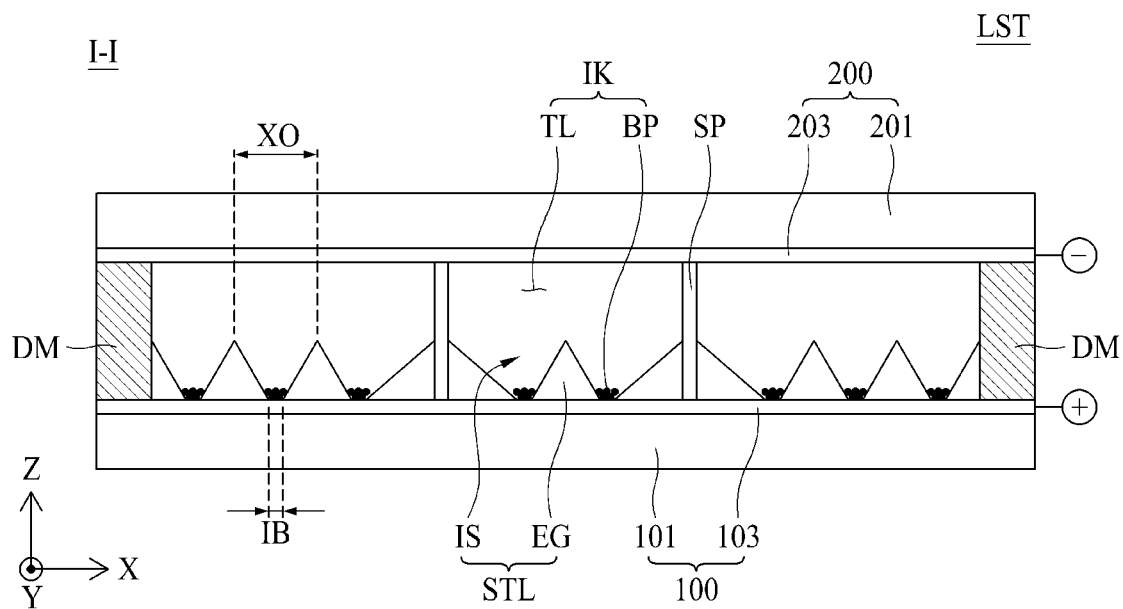

Hereinafter referring to FIG. 5 and FIGS. 6A and 6B, the operating mechanism of the light shutter panel LST according to the first embodiment of the present disclosure will be explained. FIG. 5 is a cross-sectional view, along cutting line I-I in FIG. 4A, illustrating a structure of the light shutter panel according to the first embodiment of the present disclosure. FIGS. 6A and 6B are cross-sectional views, along cutting line I-I in FIG. 4A, illustrating the operations of the light shutter panel according to the first embodiment of the present disclosure.

In the normal state as shown in FIG. 5, the charged black particles BP of the black ink IK may be charged with the negative ions, and they are evenly distributed within the transparent fluid. The normal state may refer to a state in which no voltage is applied to the lower transparent electrode layer 103 and the upper transparent electrode layer 203. In this state, as the charged black particles BP may be evenly distributed within the ink storage portion IS between the lower transparent electrode layer 103 and the upper transparent electrode layer 203, it may be the light blocking mode. In some cases, as shown in FIG. 5, some of the light which are incident into the shutter layer STL may be scattered by the charged black particle BP evenly distributed within the ink storage portion IS, so a very little amount of the light may leak out of the upper transparent substrate 201.

Hereinafter, referring to FIG. 6A, the light blocking mode completely eliminating the little amount of leaked lights will be explained. FIG. 6A is a cross-sectional view illustrating one example of the light blocking mode in the light shutter panel LST according to the first embodiment of the present disclosure. A negative common voltage may be applied to the lower transparent electrode layer 103 and a positive driving voltage may be applied to the upper transparent electrode layer 203, at the same time. Accordingly, the charged black particles BP having negative ions may move to the upper transparent substrate 201. The charged black particles BP may be evenly distributed as covering the whole surface of the upper transparent electrode layer 203, so the light shutter panel LST may be in the light blocking mode. Especially, since all of the charge black particles BP are disposed at the uppermost position of the ink storage portion IS, there is no scattered lights. Therefore, the completely light blocking mode without any leakage light may be implemented.

FIG. 6B is a cross-sectional view illustrating a light transmitting mode of the light shutter panel LST according to the first embodiment of the present disclosure. Referring to FIG. 6A, the charged black particles BP of the black ink IK may be charged with the negative ions. A positive driving voltage may be applied to the lower transparent electrode layer 103, and a negative common voltage may be applied to the upper transparent electrode layer 203, at the same time. Accordingly, all of the charge black particles BP having the negative ions may move to the lower transparent electrode layer 103. Here, the charged black particles charged black particle BP are distributed only within the minimum light blocking portion IB due to the electric field guide EG. As the result, the minimum light blocking portion IB may be in the light blocking state, and other areas may be in the light transmitting state. In other words, the incident lights from the outside of the lower electrode plate 100 may pass through the area of the maximum light transmitting portion XO excepting the minimum light blocking portion IB, and go out of the upper electrode plate 200.

Even though it is not shown in figures, the light shutter panel LST according to the first embodiment may further include a common terminal for receiving the common voltage, and a driving terminal for receiving the driving voltage. The common terminal and the driving terminal may be disposed outside of the light shutter panel LST and the driving signal may be supplied to these terminals from the external driver so the distribution state of the black ink IK may be controlled as explained above.

Second Embodiment

Figure 7:
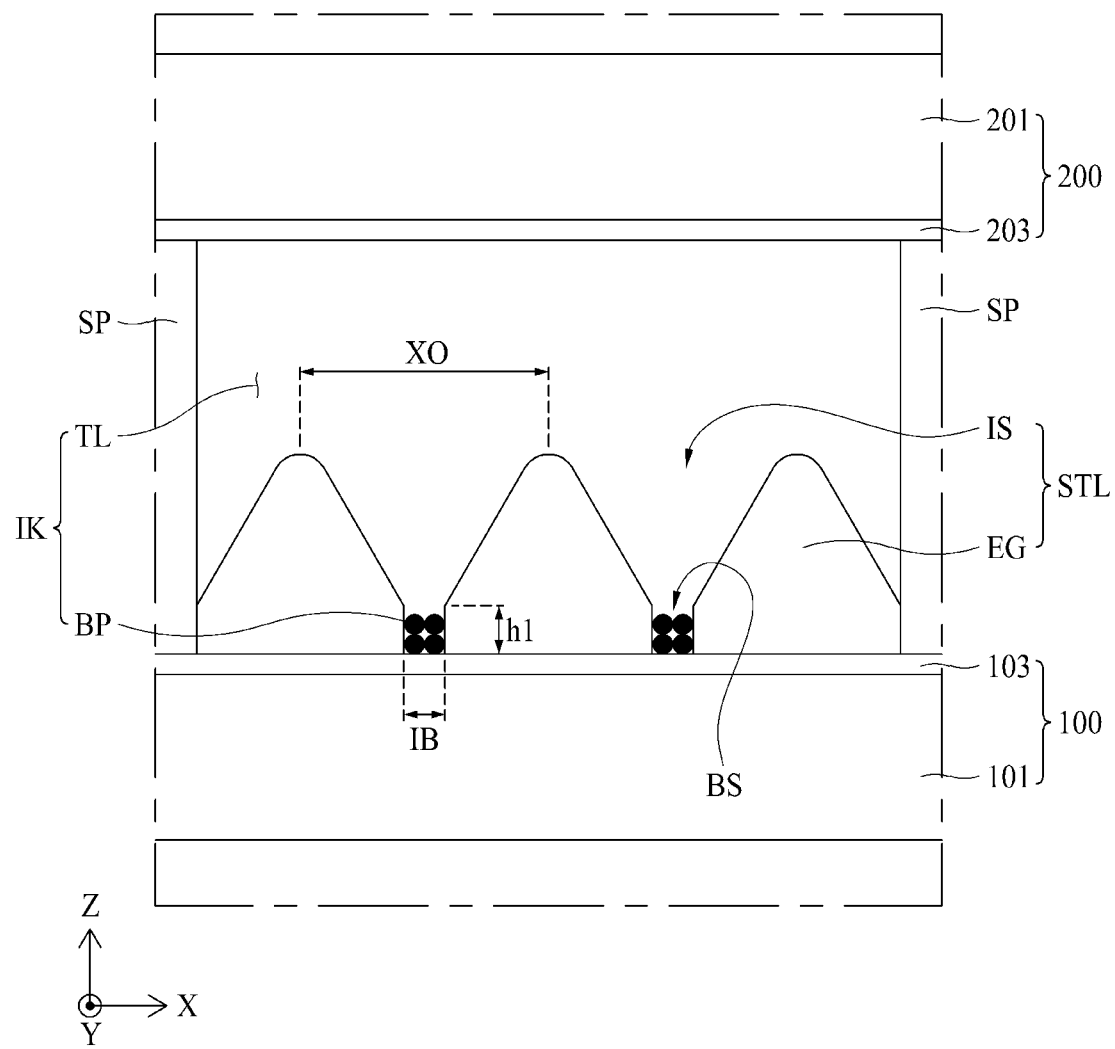
FIG. 7 is an enlarged cross-sectional view illustrating a structure of the light shutter panel according to the second embodiment of the present disclosure.

Hereinafter, referring to FIG. 7, a light shutter panel LST according to the second embodiment of the present disclosure will be explained. FIG. 7 is an enlarged cross-sectional view illustrating a structure of the light shutter panel according to the second embodiment of the present disclosure.

Referring to FIG. 7, the structure of the light shutter panel LST according to the second embodiment of the present disclosure may be very similar with that of the first embodiment. The different point is that the light shutter panel LST according to the second embodiment may further include a black particle storage portion BS. The black particle storage portion BS may be defined as the space in which the minimum light blocking portion IB extends from the bottom surface of the electric field guide EG to a certain height h1. Here, in the light transmitting mode, all of the charged black particles BP may be concentrated into the black particle storage portions BS. The black particle storage portion BS may have the cross-sectional area same with the area of the minimum light blocking portion IB regardless of the height, so that the maximum transmittance ratio may be ensured.

The top of the electric field guide EG may have a round tip structure in which the middle portion has the highest height and sloped side to downward direction, so all of the charge black particles BP may be smoothly moved into the black particle storage portion BS. When the top of the electric field guide EG may have a plane surface or a concave surface, some of the charged black particles BP may remain on the top of the electric field guide EG. Therefore, the transmittance ratio may be degraded. In one embodiment, the top of the electric field guide EG may have a convex rounded tip shape.

Third Embodiment

Figure 8A:
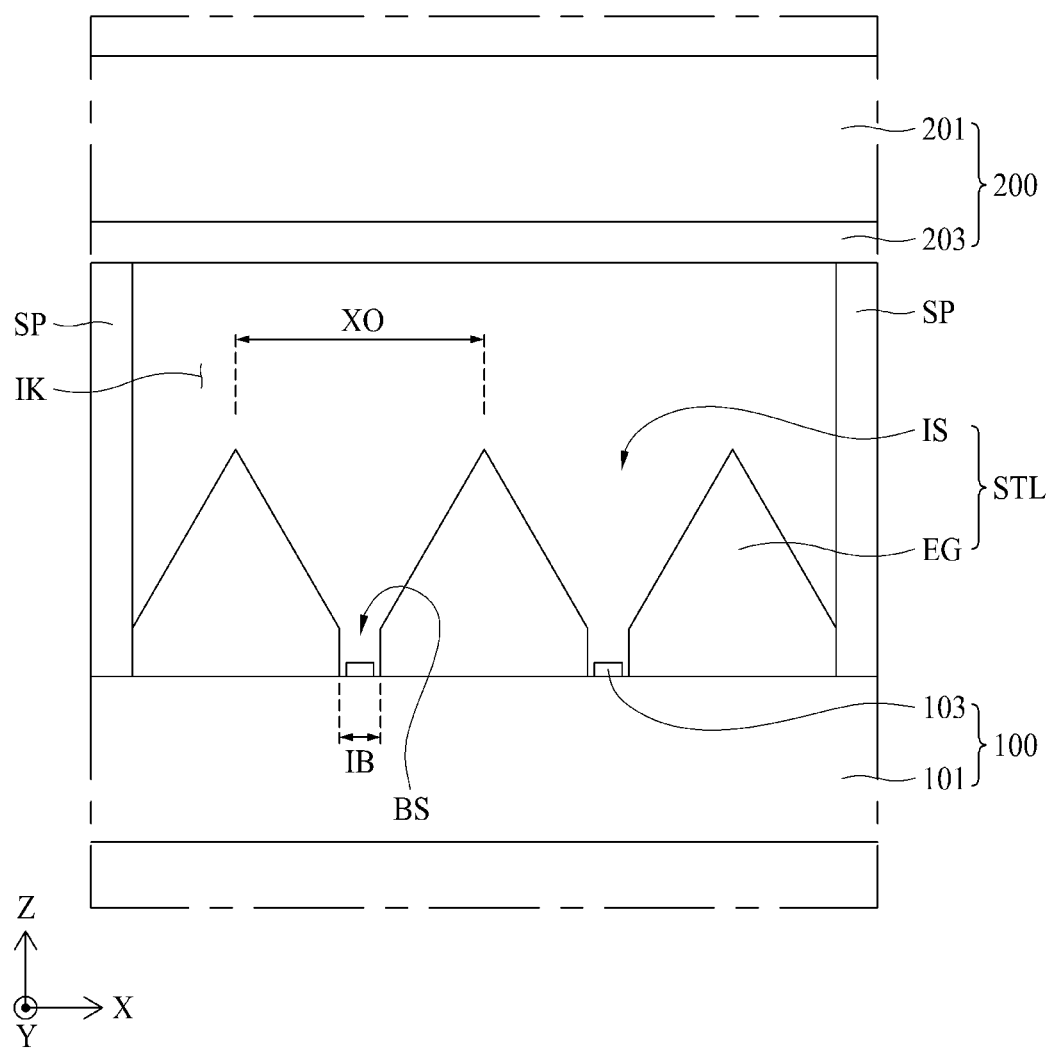
FIGS. 8A and 8B are enlarged cross-sectional views illustrating various structures of the light shutter panel according to the third embodiment of the present disclosure.
Figure 8B:
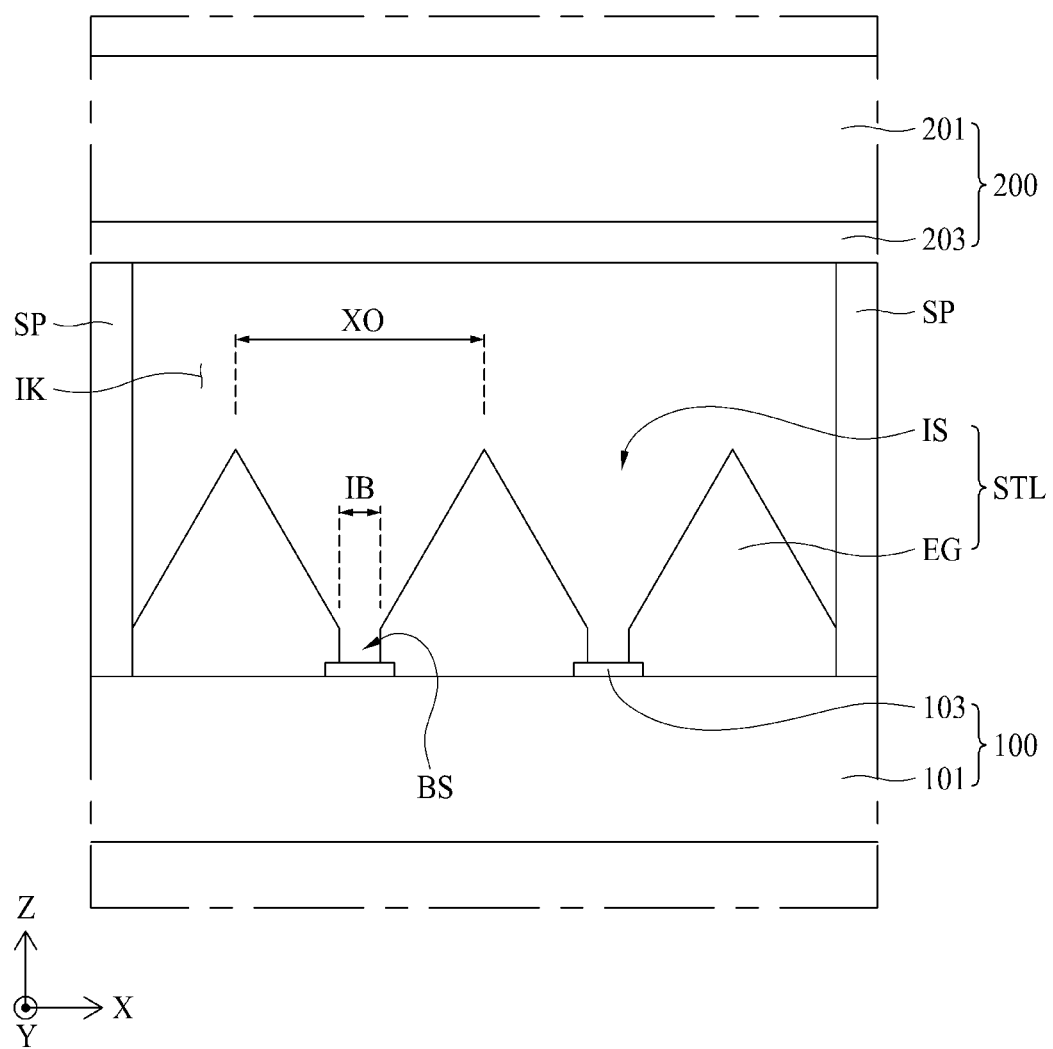

Hereinafter, referring to FIGS. 8A and 8B, the light shutter panel LST according to the third embodiment of the present disclosure will be explained. FIGS. 8A and 8B are enlarged cross-sectional views illustrating various structures of the light shutter panel according to the third embodiment of the present disclosure.

The structure of the light shutter panel LST according to the third embodiment of the present disclosure may be very similar with that of the first embodiment. The difference is that the lower transparent electrode layer 103 is not deposited on the whole surface of the lower transparent substrate 101, but is patterned on the upper surface of the lower transparent substrate 101. In particular, the lower transparent electrode layer 103 may be patterned as disposed within the minimum light blocking portion IB on the upper surface of the lower transparent substrate 101.

FIG. 8A shows one case in which the lower transparent electrode layer 103 has smaller area than the minimum light blocking portion IB and disposed within the minimum light blocking portion IB. FIG. 8B shows another case in which the lower transparent electrode layer 103 has little larger area than the minimum light blocking portion IB and the most middle area of the lower transparent electrode layer 103 is exposed by the minimum light blocking portion IB.

The minimum light blocking portion IB may be a portion to have a minimum area where the charge black particles BP are gathered to block light, in a light transmitting mode. The minimum light blocking portion IB is the area for blocking light in the light transmitting mode, as well as in the light blocking mode. Accordingly, when the lower transparent electrode layer 103 is patterned as corresponding to the minimum light blocking portion IB like the third embodiment, the lower transparent electrode layer 103 may be made of an opaque metal material.

Fourth Embodiment

Figure 9A:
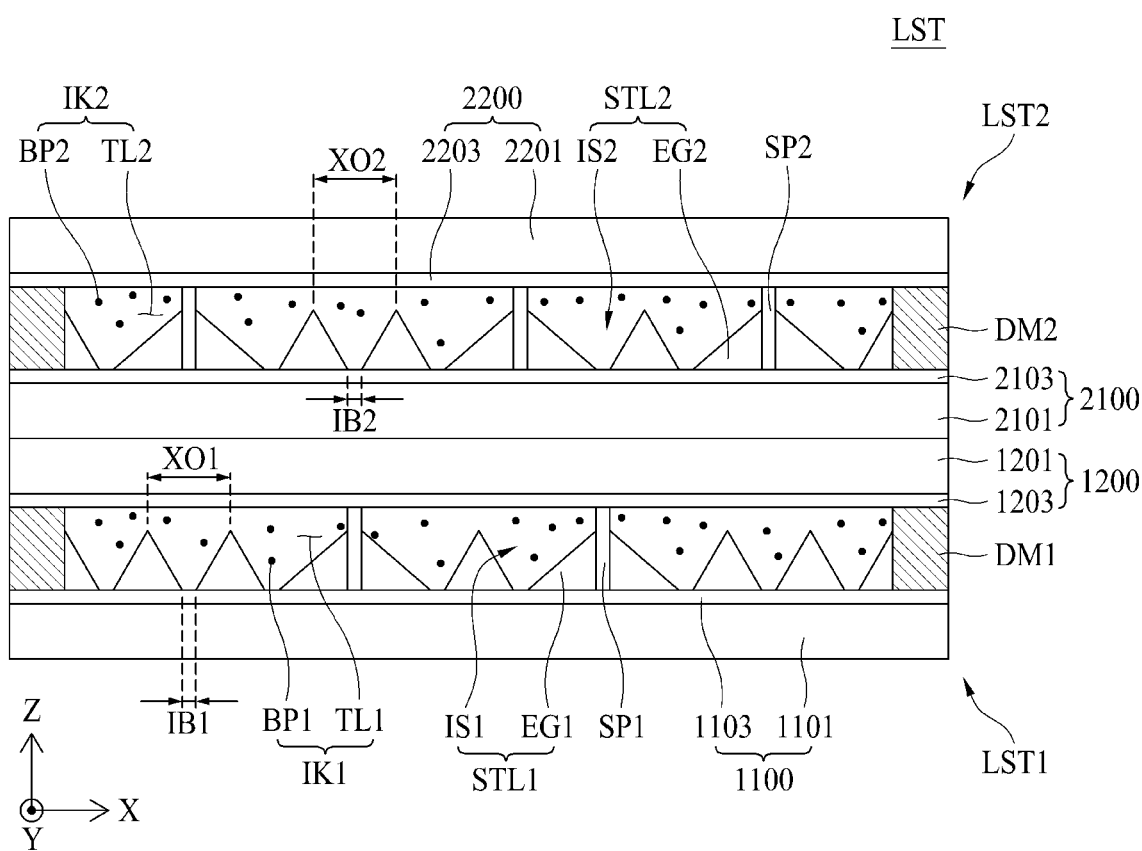
FIGS. 9A and 9B are cross-sectional views illustrating structures of light shutter panels according to the fourth embodiment of the present disclosure.
Figure 9B:
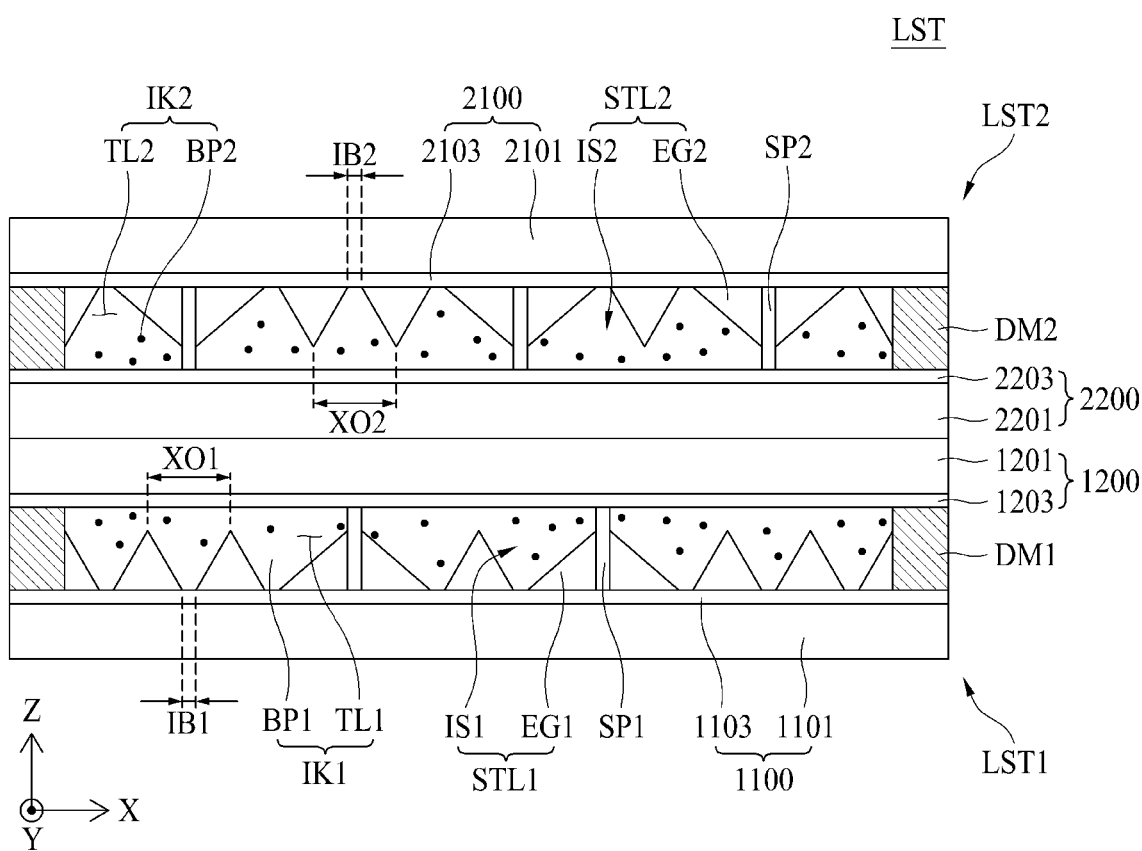

Hereinafter, referring to FIGS. 9A and 9B, a transparent display apparatus according to the fourth embodiment of the present disclosure will explained. FIGS. 9A and 9B are cross-sectional views illustrating structures of light shutter panels according to the fourth embodiment of the present disclosure.

Referring to FIG. 9A, a light shutter panel LST according to the fourth embodiment of the present disclosure may have a structure in which two light shutter panels LST explained above embodiments of the present disclosure are joined each other. For an example, the light shutter panel LST may include a first light shutter panel LST1 and a second light shutter panel LST2. The first light shutter panel LST1 and the second light shutter panel LST2 are stacked and attached each other in a vertical direction (Z axis) or a direction in which light of a background is passing through them.

The first light shutter panel LST1 may include a first lower electrode plate 1100, a first upper electrode plate 1200, a first shutter layer STL1, a first transparent spacer SP1 and a first black ink IK1. The first lower electrode plate 1100 and the first upper electrode plate 1200 may be joined or attached as to be faced each other with a predetermined interval. For example, the first lower electrode plate 1100 and the first upper electrode plate 1200 may be bonded each other using a first dam structure DM1 disposed at the circumference area of them.

The first lower electrode plate 1100 may include a first lower transparent substrate 1101 and a first lower transparent electrode layer 1103. The first upper electrode plate 1200 may include a first upper transparent substrate 1201 and a first upper transparent electrode layer 1203.

The first shutter layer STL1 may be disposed between the first lower electrode plate 1100 and first upper electrode plate 1200. The first shutter layer STL1 may include a first maximum light transmitting portion XO1, a first minimum light blocking portion IB1, a first ink storage portion IS1 and a first electric field guide EG1. The first ink storage portion IS1 may be a space formed between the first maximum light transmitting portion XO1 and the first minimum light blocking portion IB1. A plurality of the first ink storage portions IS1 may be arrayed in succession, and the first electric field guide EG1 may be disposed between the neighboring two first ink storage portions IS1.

A plurality of first spacers SP1 are distributed between the first lower electrode plate 1100 and the first upper electrode plate 1200 for maintaining the constant gap between them. It is most important that the first light shutter panel LST1 is configured to have the maximum light transmittance ratio. In this case, in one embodiment, the first spacers SP1 may be formed of a transparent material.

The second light shutter panel LST2 may include a second lower electrode plate 2100, a second upper electrode plate 2200, a second shutter layer STL2, a second transparent spacer SP2 and a second black ink IK2. The second lower electrode plate 2100 and the second upper electrode plate 2200 may be joined or attached as to be faced each other with a predetermined interval. For example, the second lower electrode plate 2100 and the second upper electrode plate 2200 may be bonded each other using a second dam structure DM2 disposed at the circumference area of them.

The second shutter layer STL2 may be disposed between the second lower electrode plate 2100 and second upper electrode plate 2200. The second shutter layer STL2 may include a second maximum light transmitting portion XO2, a second minimum light blocking portion IB2, a second ink storage portion IS2 and a second electric field guide EG2. The second ink storage portion IS2 may be a space formed between the second maximum light transmitting portion XO2 and the first minimum light blocking portion IB2. A plurality of the second ink storage portions IS2 may be arrayed in succession, the second electric field guide EG2 may be disposed between the neighboring two second ink storage portions IS2.

The second lower electrode plate 2100 may include a second lower transparent substrate 2101 and a second lower transparent electrode layer 2103. The second upper electrode plate 2200 may include a second upper transparent substrate 2201 and a second upper transparent electrode layer 2203.

A plurality of second spacers SP2 are distributed between the second lower electrode plate 2100 and the second upper electrode plate 2200 for maintaining the constant gap between them. It is most important that the second light shutter panel LST2 is configured to have the maximum light transmittance ratio. In this case, it is preferable that the second spacers SP2 may be formed of a transparent material.

Referring to FIG. 9A, the first light shutter panel LST1 and the second light shutter panel LST2 may be stacked each other in which the first upper electrode plate 1200 and the second lower electrode plate 2100 are joined together as being faced each other. On the contrary, referring to FIG. 9B, the first light shutter panel LST1 and the second light shutter panel LST2 may be stacked each other in which the first upper electrode plate 1200 and the second upper electrode plate 2200 are joined together as being faced each other. The light shutter panel LST according to the fourth embodiment shown in FIGS. 9A and 9B may be operated as the same method described with FIGS. 5, 6A and 6B.

In one embodiment, the light shutter panel LST may be joined in which the first spacers SP1 and the second spacers SP2 may not be overlapped each other. In order to ensure the light transmittance ratio in maximum value, in one embodiment, the first spacers SP1 and the second spacers SP2 are made of the transparent material, in the light transmitting mode. However, in the light blocking mode, the light may leak as passing through the transparent spacers so that the light blocking ratio may be degraded somewhat.

As shown in FIGS. 9A and 9B, the first spacers SP1 and the second spacers SP2 may not being overlapped but being misaligned each other, the light leaked by passing through the first spacers SP1 may be blocked by the second shutter panel LST2. Therefore, the light shutter panel according to the fourth embodiment may have a light blocking ratio without light leakage in the light blocking mode.

In addition, in one embodiment, the first minimum light blocking portion IB1 of the first light shutter panel LST1 and the first minimum light blocking portion IB2 of the second light shutter panel LST2 may be overlapped each other. As explained above, the area ratio of the first minimum light blocking portion IB2 may be an important factor for deciding the light transmittance ratio. The light shutter panel LST according to the fourth embodiment, the maximum light transmittance ratio may be decided by the areas of the first minimum light blocking portion IB1 and the first minimum light blocking portion IB2, as seeing the light shutter panel LST from just in front of the light shutter panel LST. Therefore, by arranging the first minimum light blocking portion IB1 and the first minimum light blocking portion IB2 as being overlapped with each other completely, the maximum light transmittance ratio may be ensured.

The light shutter panel according to the fourth embodiment may ensure the maximum light transmittance ratio in the light transmitting mode and the perfect light blocking ratio in the light blocking mode.

Fifth Embodiment

Figure 10:
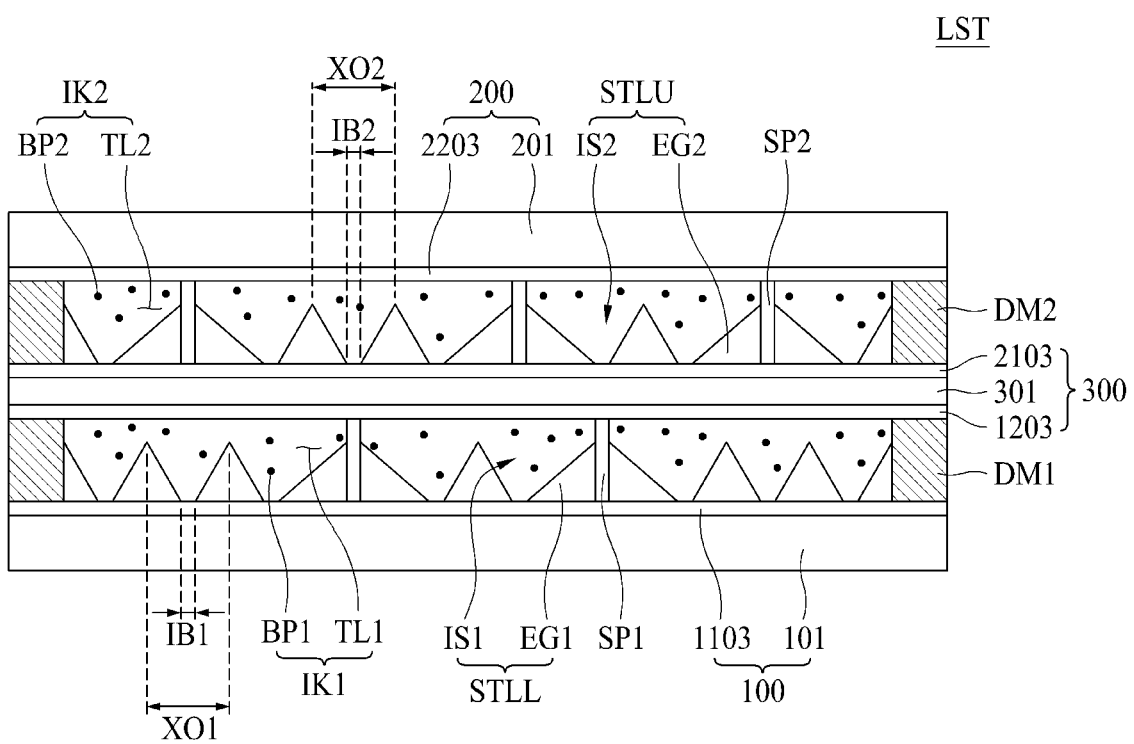
FIG. 10 is a cross-sectional view illustrating a structure of a light shutter panel according to the fifth embodiment of the present disclosure.

Hereinafter referring to FIG. 10, the fifth embodiment of the present disclosure will be explained. FIG. 10 is a cross-sectional view illustrating a structure of a light shutter panel according to the fifth embodiment of the present disclosure.

A structure of the light shutter panel LST according to the fifth embodiment may have the same structure of that according to the fourth embodiment. The difference point is that the LST according to the fourth embodiment may be configured by stacking and attaching two light shutter panels according to the first embodiment, on the contrary the LST according to the fifth embodiment may be formed to have the stacked structure in one batch manufacturing process.

In an example, the light shutter panel LST according to the fourth embodiment may have a structure in which the first upper transparent substrate 1201 and the second lower transparent substrate 2101 having the same thickness are attached as being face to face each other, or the first upper transparent substrate 1201 and the second upper transparent substrate 2201 having the same thickness are attached as being face to face each other. Therefore, as the lights passing through the pair of the first upper transparent substrate 1201 and the second lower transparent substrate 2101 or the pair of the first upper transparent substrate 1201 and the second upper transparent substrate 2201, the light intensity may be degraded, in the light transmitting mode. In order to reduce the degradation of the light intensity, a middle substrate thinner than the total thickness of the first upper transparent substrate 1201 and the second lower transparent substrate 2101 or the total thickness of the first upper transparent substrate 1201 and the second upper transparent substrate 2201 may be applied. Further, the first shutter layer STL1 may be formed at the lower portions of the middle substrate and the second shutter layer STL2 may be formed at the upper portion of the middle substrate.

In detail, the light shutter panel LST according to the fifth embodiment of the present disclosure may include a lower electrode plate 100, a common electrode plate 300, a upper electrode plate 200, a lower shutter layer STLL, a upper shutter layer STLU, a first transparent spacers SP1, a second transparent spacers SP2 and a black ink IK.

The lower electrode plate 100, upper electrode plate 200 and common electrode plate 300 may be stacked each other to have a structure in which common electrode plate 300 may be interposed between the lower electrode plate 100 and upper electrode plate 200 as being faced each other. For example, the lower electrode plate 100 may be disposed under the common electrode plate 300 as facing the lower surface of the common electrode plate 300, and the upper electrode plate 200 may be disposed over the common electrode plate 300 as facing the upper surface of the common electrode plate 300. The lower electrode plate 100 and common electrode plate 300 may be attached each other by the first dam structure DM1 disposed at the circumference areas of the lower electrode plate 100 and common electrode plate 300. In addition, the upper electrode plate 200 and common electrode plate 300 may be attached each other by the second dam structure DM1 disposed at the circumference areas of the upper electrode plate 200 and common electrode plate 300.

The lower electrode plate 100 may include a lower transparent substrate 101 and a first lower transparent electrode layer 1103. The upper electrode plate 200 may include an upper transparent substrate 201 and a second upper transparent electrode layer 2203.

The lower shutter layer STLL may be formed on the first lower transparent electrode layer 1103 of the lower electrode plate 100. The lower shutter layer STLL may include a first maximum light transmitting portion XO1, a first minimum light blocking portion IB1, a first electric field guide EG1 and first ink storage portion IS1. The first ink storage portion IS1 may be a space formed between first maximum light transmitting portion XO1 and first minimum light blocking portion IB1. A plurality of the first ink storage portions IS1 may be arrayed in succession, the first electric field guide EG1 may be disposed between the neighboring two first ink storage portions IS1.

A plurality of the first spacers SP1 are distributed between the lower electrode plate 100 and the common electrode plate 300 for maintaining the constant gap between them. It is most important that the light shutter panel LST according to the fifth embodiment may be configured to have the maximum light transmittance ratio. Therefore, it is preferable that the first spacers SP1 may be formed of a transparent material.

The common electrode plate 300 may include a common transparent substrate common transparent substrate 301, a first upper transparent electrode layer 1203 and a second lower transparent electrode layer 2103. For example, the first upper transparent electrode layer 1203 may be deposited on the whole lower surface of the common transparent substrate 301. In addition, the second lower transparent electrode layer 2103 may be deposited on the whole upper surface of the common transparent substrate 301.

After forming the lower shutter layer STLL on the lower electrode plate 100, the common electrode plate 300 may be attached on the lower electrode plate 100 with the first dam structure DM1 and first spacer SP1 therebetween. Then, the upper shutter layer STLL may be formed on the common electrode plate 300.

The upper shutter layer STLL may include a second maximum light transmitting portion XO2, first minimum light blocking portion IB2, a second electric field guide EG2 and a second ink storage portion IS2. The second ink storage portion IS2 may be a space formed between the second maximum light transmitting portion XO2 and the first minimum light blocking portion IB2. A plurality of the second ink storage portions IS2 may be arrayed in succession, and the second electric field guide EG2 may be disposed between the neighboring two second ink storage portions IS2.

A plurality of the second spacers SP2 are distributed between the common electrode plate 300 and the upper electrode plate 200 for maintaining the constant gap between them. It is most important that the light shutter panel LST is configured to have the maximum light transmittance ratio. Therefore, in one embodiment, the second spacers SP2 may be formed of a transparent material.

The upper electrode plate 200 may be stacked and attached on the upper shutter layer STLL. For example, the upper electrode plate 200 may be attached on the common electrode plate 300 with a predetermined gap distance by the second dam structure DM1 and second spacer SP2. As the result, the lower shutter layer STLL may be disposed between the first lower transparent electrode layer 1103 and the first upper transparent electrode layer 1203. Further, the upper shutter layer STLL may be disposed between the second lower transparent electrode layer 2103 and the second upper transparent electrode layer 2203.

The first black ink IK1 may be filled in the first ink storage portion IS1. Further, the second black ink IK2 may be filled in the second ink storage portion IS2. The first black ink IK1 may include a first transparent fluid TL1 and a first charged black particle BP1. The second black ink IK2 may include a second transparent fluid TL2 and a second charge black particle BP2.

In the fifth embodiment, the first upper transparent electrode layer 1203 and second lower transparent electrode layer 2103 deposited on the both surface of the common electrode plate 300 may be configured to be supplied with the same electric voltage. For example, the first upper transparent electrode layer 1203 and the second lower transparent electrode layer 2103 may be configured to be supplied with a negative (−) voltage. Further, the first lower transparent electrode layer 1103 facing with the first upper transparent electrode layer 1203 and the second upper transparent electrode layer 2203 facing with the second lower transparent electrode layer 2103 may be configured to be supplied with a positive (+) driving voltage.

In one embodiment, the first charged black particles BP1 included in the first black ink IK1 may be charged with the negative (−) ions, and the second charged black particles BP2 included in the second black ink IK2 may be charged with the positive (+) ions. In the normal state in which no electric voltage is applied, the light shutter panel LST may be in light blocking mode in which the first charged black particles BP1 may be evenly dispersed into the first transparent fluid TL1, and the second charged black particles BP2 may be evenly dispersed into the second transparent fluid TL2. When applying the negative (−) voltage to the first upper transparent electrode layer 1203 and the second lower transparent electrode layer 2103 and the positive (+) voltage is applied to the first lower transparent electrode layer 1103 and the second upper transparent electrode layer 2203, the light shutter panel LST may be in the light transmitting mode in which the first charged black particles BP1 may be gathered at the first minimum light blocking portion IB1 and the second charged black particles BP2 may be gathered at the first minimum light blocking portion IB2.

In the light shutter panel LST according to the fifth embodiment, in one embodiment, the first spacers SP1 and the second spacers SP2 may be not overlapped with each other. When the first spacers SP1 and the second spacers SP2 are made of the transparent materials, the light transmittance ratio may be ensured with the maximum value. However, in the light blocking mode, the light blocking ratio may be degraded by the leakage of lights through the transparent spacers.

However, as the first spacers SP1 and the second spacers SP2 are not overlapped with each other but misaligned each other as shown in FIG. 10, the leaked light from the first spacers SP1 may be blocked by the upper shutter layer STLL. Therefore, in the light blocking mode, the light leakage may be perfectly prevented. Considering the light path, most of all leaked light from the first spacer SP1 may not pass through the second spacer SP2.

Further, in one embodiment, the first minimum light blocking portion IB1 of the lower shutter layer STLL may be disposed as being overlapped with the first minimum light blocking portion IB2 of the upper shutter layer STLL. As explained in the fourth embodiment, as looking the light shutter panel LST in the just front direction, the maximum light transmittance ratio may be defined as the areas of the first minimum light blocking portion IB1 and the first minimum light blocking portion IB2. Therefore, by disposing the first minimum light blocking portion IB1 and first minimum light blocking portion IB2 as to completely overlap with each other, the maximum light transmittance ratio may be acquired.

Accordingly, the light shutter panel according to the fifth embodiment of the present disclosure may have the maximum light transmittance ratio in the light transmitting mode, and implement the perfect light blocking state without any light leakage in the light blocking mode.

In summary, the light shutter panel according to the present disclosure may include a plurality of the maximum light transmitting portions XO arrayed in a matrix manner. At each maximum light transmitting portion XO, one minimum light blocking portion IB may be disposed. Each of maximum light transmitting portion XO and each of minimum light blocking portion IB are connected each other. By this connecting structure, the ink storage portion IS and the electric field guide EG are formed and defined.

Here, the electric field guide EG may be a structural element to avoid the distortion when the electric field is formed to the ink storage portion IS. Further, the electric field guide EG may be a structural element for preventing any distortion from being occurred when switching the distribution state of the charged black particles from the maximum diffusion state and the minimum diffusion state. Therefore, the electric field guide EG may be referred to as a 'guide for charged black particle' or a 'light blocking guide'.

As explained with FIG. 1, the light shutter panel LST may be disposed at the rear side of the (DIP). Each of the maximum light transmitting portion XO of the light shutter panel LST may be disposed as covering a plurality of the unit pixels UP. For example, when the transparent display panel DIP may have a high-resolution specification over 300 dpi (dot per inch), one of maximum light transmitting portion XO may be disposed as being allocated to hundreds or thousands of unit pixels UP. In this case, one minimum light blocking portion IB may be disposed as being allocated to tens of unit pixels UP. The light shutter panel LST may be applied to the transparent display panel DIP having the high-resolution specification. Therefore, the light shutter panel LST may be joined and arranged with the transparent display panel DIP without considering the relationship of the structure or the arrangement between the shutter layer and the unit pixels.

Features, structures, effects and so on described in the above described examples of the present disclosure are included in at least one example of the present disclosure, and are not necessarily limited to only one example. Furthermore, features, structures, effects and so on exemplified in at least one example of the present disclosure may be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A light shutter panel comprising:
a first light shutter panel including:
a first lower electrode plate;
a first upper electrode plate facing with the first lower electrode plate;
a first shutter layer disposed between the first lower electrode plate and the first upper electrode plate, and including first maximum light transmitting portion, a first minimum light blocking portion, first ink storage portions connecting the first maximum light transmitting portion and the first minimum light blocking portion, and a first electric field guide disposed between the first ink storage portions;
a plurality of first spacers maintaining a gap between the first lower electrode plate and the first upper electrode plate; and
a first black ink filled into the first ink storage portions of the first shutter layer, and
a second light shutter panel including:
a second lower electrode plate;
a second upper electrode plate facing with the second lower electrode plate;
a second shutter layer disposed between the second lower electrode plate and the second upper electrode plate, the second shutter layer including a second maximum light transmitting portion, a second minimum light blocking portion, second ink storage portions connecting the second maximum light transmitting portion and the second minimum light blocking portion, and a second electric field guide disposed between the second ink storage portions;
a plurality of second spacers maintaining a gap between the second lower electrode plate and the second upper electrode plate; and
a second black ink filled into the second ink storage portions of the second shutter layer,
wherein the first light shutter panel and the second light shutter panel are joined in a thickness direction,
wherein the first minimum light blocking portion and the second minimum light blocking portion are overlapped each other, and
wherein the first spacers are not overlapped with the second spacers.

2. The light shutter panel according to claim 1, wherein the first lower electrode plate includes:
a first lower transparent substrate; and
a first lower transparent electrode layer disposed on a whole upper surface of the first lower transparent substrate,
wherein the first upper electrode plate includes:
a first upper transparent substrate; and
a first upper transparent electrode layer disposed on the whole upper surface of the first upper transparent substrate,
wherein the first lower electrode plate and the first upper electrode plate are joined to each other as facing the first lower transparent electrode layer and the first upper transparent electrode layer,
wherein the second lower electrode plate includes:
a second lower transparent substrate; and
a second lower transparent electrode layer disposed on the whole upper surface of the second lower transparent substrate,
wherein the second upper electrode plate includes:
a second upper transparent substrate; and
a second upper transparent electrode layer disposed on a whole upper surface of the second upper transparent substrate, and
wherein the second lower electrode plate and the second upper electrode plate are joined to each other as facing the second lower transparent electrode layer and the second upper transparent electrode layer.

3. The light shutter panel according to claim 1, wherein the first ink storage portions have a first profile in which a first cross sectional shape of the first ink storage portions extend from the first minimum light blocking portion to the first maximum light transmitting portion, and a first cross sectional area of the first ink storage portions increase gradually,
wherein the first electric field guide extends from the first maximum light transmitting portion to the first minimum light blocking portion, and a first cross sectional area of the first electric field guide decreases gradually,
wherein the second ink storage portions have a second profile in which a second cross sectional shape of the second ink storage portions extend from the second minimum light blocking portion to the second maximum light transmitting portion, and a second cross sectional area of the second ink storage portions increases gradually, and
wherein the second electric field guide extends from the second maximum light transmitting portion to the second minimum light blocking portion, and a second crossectional area of the second electric field guide decreases gradually.

4. The light shutter panel according to claim 1, wherein an area of the first minimum light blocking portion is at most 30% of an area of the first maximum light transmitting portion, and
wherein an area of the second minimum light blocking portion is at most 30% of an area of the second maximum light transmitting portion.

5. The light shutter panel according to claim 1, wherein a height of the first electric field guide is in a range of 50% to 90% of a height of the first spacer, and
wherein a height of the second electric field guide is in a range of 50% to 90% of a height of the second spacer.

6. The light shutter panel according to claim 2, wherein the first black ink and the second black ink include:
a transparent fluid; and
a plurality of charge black particles evenly dispersed into the transparent fluid.

7. The light shutter panel according to claim 6, wherein a common terminal for supplying a common voltage is connected to the first upper transparent electrode layer and the second upper transparent electrode layer,
wherein a driving terminal for supplying a driving voltage is connected to the first lower transparent electrode layer and the second lower transparent electrode layer, and
wherein the plurality of charged black particles are charged with ions having a same polarity of the common voltage.

8. The light shutter panel according to claim 7, wherein the first upper transparent substrate is attached to the second upper transparent substrate.

9. The light shutter panel according to claim 7, wherein the first upper transparent substrate is attached to the second lower transparent substrate.

10. A light shutter panel comprising:
a lower electrode plate;
a common electrode plate disposed as facing with the lower electrode plate;
an upper electrode plate disposed as facing with the common electrode plate;
a lower shutter layer disposed between the lower electrode plate and the common electrode plate, the lower shutter layer including a first maximum light transmitting portion, a first minimum light blocking portion, first electric field guides connecting the first maximum light transmitting portion and the first minimum light blocking portion, and a first ink storage portion disposed between the first electric field guides;
an upper shutter layer disposed between the upper electrode plate and the common electrode plate, the upper shutter layer including a second maximum light transmitting portion, a second minimum light blocking portion, second electric field guides connecting the second maximum light transmitting portion and the second minimum light blocking portion, and a second ink storage portion disposed between the second electric field guides;
a plurality of first transparent spacers maintaining a first gap between the lower electrode plate and the common electrode plate, uniformly;
a plurality of second transparent spacers maintaining a second gap between the upper electrode plate and the common electrode plate, uniformly;
a first black ink filled into the first ink storage portion; and
a second black ink filled into the second ink storage portion,
wherein the first minimum light blocking portion and the second minimum light blocking portion are overlapped each other, and
wherein the plurality of first transparent spacers are not overlapped with the plurality of second transparent spacers.

11. The light shutter panel according to claim 10, wherein the lower electrode plate includes:
a lower transparent substrate; and
a lower transparent electrode layer deposited on a whole upper surface of the lower transparent substrate,
wherein the upper electrode plate includes:
an upper transparent substrate; and
an upper transparent electrode layer deposited on a whole upper surface of the upper transparent substrate,
wherein the common electrode plate includes:
a common transparent substrate; and
common transparent electrode layers deposited on a whole upper surface and lower surface of the common transparent substrate, and
wherein the lower electrode plate and the upper electrode plate are joined to each other as the lower transparent electrode layer and the upper transparent electrode layer are facing each other with the common electrode plate therebetween.

12. The light shutter panel according to claim 10, wherein the first electric field guide extends from the first minimum light blocking portion to the first maximum light transmitting portion, and a cross sectional area of the first electric field guide decreases gradually,
wherein the first ink storage portion extends from the first minimum light blocking portion to the first maximum light transmitting portion, and a cross sectional area of the first ink storage portion increases gradually,
wherein the second electric field guide extends from the second minimum light blocking portion to the second maximum light transmitting portion, and a cross sectional area of the second electric field guide decreases gradually, and
wherein the second ink storage portion extends from the second minimum light blocking portion to the second maximum light transmitting portion, and a cross sectional area of the second ink storage portion increases gradually.

13. The light shutter panel according to claim 10, wherein an area of the first minimum light blocking portion is at most 30% of an area of the first maximum light transmitting portion, and
wherein an area of the second minimum light blocking portion is at most 30% of an area of the second maximum light transmitting portion.

14. The light shutter panel according to claim 10, wherein a height of the first electric field guide is in a range of 50% to 90% of a height of the plurality of first spacers, and
wherein a height of the second electric field guide is in a range of 50% to 90% of a height of the plurality of second spacers.

15. The light shutter panel according to claim 10, wherein the first black ink includes:
a first transparent fluid; and
a plurality of first charge black particles evenly dispersed into the first transparent fluid, and
wherein the second black ink includes:
a second transparent fluid; and
a plurality of second charge black particles evenly dispersed into the second transparent fluid.

16. The light shutter panel according to claim 15, wherein the plurality of first charged black particles and the plurality of second charged black particles have different polarities from each other.

17. The light shutter panel according to claim 15, wherein a driving terminal for supplying a positive driving voltage is connected to the upper electrode plate and the lower electrode plate,
wherein a common terminal for supplying a negative common voltage is connected to the common electrode plate, and
wherein the plurality of first charged black particles are charged with negative ions, and the plurality of second charged black particles are charged with positive ions.

18. A transparent display apparatus comprising:
a transparent display panel including a plurality of pixels in a matrix manner, each of pixel including an emission area and a transmission area; and
a light shutter panel including:
a first light shutter panel including:
a first lower electrode plate;
a first upper electrode plate facing with the first lower electrode plate;
a first shutter layer disposed between the first lower electrode plate and the first upper electrode plate, and including first maximum light transmitting portion, a first minimum light blocking portion, first ink storage portions connecting the first maximum light transmitting portion and the first minimum light blocking portion, and a first electric field guide disposed between the first ink storage portions;
a plurality of first spacers maintaining a gap between the first lower electrode plate and the first upper electrode plate; and
a first black ink filled into the first ink storage portions of the first shutter layer, and a second light shutter panel including:
a second lower electrode plate;
a second upper electrode plate facing with the second lower electrode plate;
a second shutter layer disposed between the second lower electrode plate and the second upper electrode plate, and including second maximum light transmitting portion, a second minimum light blocking portion, second ink storage portions connecting the second maximum light transmitting portion and the second minimum light blocking portion, and a second electric field guide disposed between the second ink storage portions;
a plurality of second spacers maintaining a gap between the second lower electrode plate and the second upper electrode plate; and
a second black ink filled into the second ink storage portions of the second shutter layer, wherein the first light shutter panel and the second light shutter panel are joined in a thickness direction, wherein the first minimum light blocking portion and the second minimum light blocking portion are overlapped each other, and wherein the plurality of first spacers are not overlapped with the plurality of second spacers, a black ink filled into the ink storage portion of the shutter layer.

19. A transparent display apparatus comprising:
a transparent display panel including a plurality of pixels in a matrix manner, each of the plurality of pixels including an emission area and a transmission area; and
a light shutter panel including:
a lower electrode plate;
a common electrode plate disposed as facing with the lower electrode plate;
an upper electrode plate disposed as facing with the common electrode plate;
a lower shutter layer disposed between the lower electrode plate and the common electrode plate, the lower shutter layer including a first maximum light transmitting portion, a first minimum light blocking portion, first electric field guides connecting the first maximum light transmitting portion and the first minimum light blocking portion, and a first ink storage portion disposed between the first electric field guides;
an upper shutter layer disposed between the upper electrode plate and the common electrode plate, the upper shutter layer including a second maximum light transmitting portion, a second minimum light blocking portion, second electric field guides connecting the second maximum light transmitting portion and the second minimum light blocking portion, and a second ink storage portion disposed between the second electric field guides;
a plurality of first transparent spacers maintaining a first gap between the lower electrode plate and the common electrode plate, uniformly;
a plurality of second transparent spacers maintaining a second gap between the upper electrode plate and the common electrode plate, uniformly;
a first black ink filled into the first ink storage portions; and
a second black ink filled into the second ink storage portions, wherein the first minimum light blocking portion and the second minimum light blocking portion are overlapped each other, and wherein the plurality of first transparent spacers are not overlapped with the plurality of second transparent spacers.

* * * * *